United States Patent
Ruth

(10) Patent No.: US 9,610,699 B2
(45) Date of Patent: Apr. 4, 2017

(54) CHAINSAW CARVING GUIDE BAR

(76) Inventor: Brian J. Ruth, Lehighton, PA (US)

( * ) Notice: Subject to any disclaimer, the term of this patent is extended or adjusted under 35 U.S.C. 154(b) by 985 days.

(21) Appl. No.: 13/546,214

(22) Filed: Jul. 11, 2012

(65) Prior Publication Data

US 2012/0279074 A1 Nov. 8, 2012

Related U.S. Application Data

(60) Division of application No. 12/729,465, filed on Mar. 23, 2010, now Pat. No. 8,225,515, and a continuation-in-part of application No. 11/784,420, filed on Apr. 6, 2007, now abandoned.

(51) Int. Cl.
*B23D 57/02* (2006.01)
*B27B 17/02* (2006.01)

(52) U.S. Cl.
CPC ............ *B27B 17/02* (2013.01); *B23D 57/023* (2013.01); *B27B 17/025* (2013.01)

(58) Field of Classification Search
USPC .... 30/387, 385, 386, 383, 384, 381; 83/821, 83/788, 792, 820; 451/355, 296, 298
See application file for complete search history.

(56) References Cited

U.S. PATENT DOCUMENTS

| | | | |
|---|---|---|---|
| 2,348,612 A | | 5/1944 | Deacon |
| 2,487,322 A | * | 11/1949 | Eriksson ........................ 30/384 |
| 2,624,243 A | * | 1/1953 | Hedberg et al. ............. 409/199 |
| 2,660,204 A | | 11/1953 | Rosenboom |
| 2,731,048 A | | 1/1956 | Seizert |
| 2,845,967 A | | 8/1958 | Hutchinson |
| 2,901,131 A | | 8/1959 | Collier |
| 3,191,646 A | | 6/1965 | Merz |
| 3,750,284 A | | 8/1973 | Swift |
| 4,138,813 A | | 2/1979 | Harada et al. |
| 4,334,358 A | | 6/1982 | Reynolds |
| 4,513,799 A | * | 4/1985 | Lindblom et al. ............ 144/379 |
| 4,654,972 A | | 4/1987 | Sellmaier et al. |

(Continued)

FOREIGN PATENT DOCUMENTS

EP 1502718 A2 2/2005
JP 06-297404 10/1994

OTHER PUBLICATIONS

Corresponding PCT Search Report & Written Opinion of May 19, 2011 for PCT/US2011/028987.

(Continued)

*Primary Examiner* — Omar Flores Sanchez
(74) *Attorney, Agent, or Firm* — The Belles Group, P.C.

(57) ABSTRACT

A chainsaw guide bar adapted for carving and shaping a workpiece. In one embodiment, a guide bar includes a mounting end, a distal working end, and an intermediate portion offset from the longitudinal axis defined the mounting end. In one embodiment, the guide bar includes an axially elongated recess providing an unsupported span of chain which is movable between undeflected and deflected positions for contouring a workpiece. The chain is engaged with and supported in a guide rail slot along the top peripheral edge of the guide bar. Various embodiments of the guide bar have an asymmetrical shape. The guide bar may further include an idler sprocket mechanism operable to guide movement of the saw chain along the outer peripheral edge of the guide bar.

16 Claims, 16 Drawing Sheets

(56) References Cited

U.S. PATENT DOCUMENTS

| | | | |
|---|---|---|---|
| 4,837,934 A | 6/1989 | Krohn | |
| 5,014,435 A | 5/1991 | Date et al. | |
| 5,025,561 A | 6/1991 | Sugihara et al. | |
| 5,035,058 A | 7/1991 | Date et al. | |
| 5,216,814 A | 6/1993 | McGregor | |
| 5,249,363 A | 10/1993 | Mitrega et al. | |
| 5,271,157 A | 12/1993 | Wieninger et al. | |
| 5,842,279 A | 12/1998 | Andress et al. | |
| 6,138,339 A | 10/2000 | Escher et al. | |
| 6,178,960 B1 * | 1/2001 | Svensson | 125/21 |
| 6,397,475 B1 | 6/2002 | Pettersson et al. | |
| 6,427,342 B1 | 8/2002 | Breitbarth et al. | |
| 6,698,101 B2 | 3/2004 | Chen | |
| D630,484 S * | 1/2011 | Ruth | D8/70 |
| 8,499,463 B2 * | 8/2013 | Arvidsson | 30/381 |

OTHER PUBLICATIONS

Hal MacIntosh, The Art and Craft of Chainsaw Carving, Copyright 2001, Fox chapel Publishing; ISBN 978-1-56523-128-3, 2 pages from book.

* cited by examiner

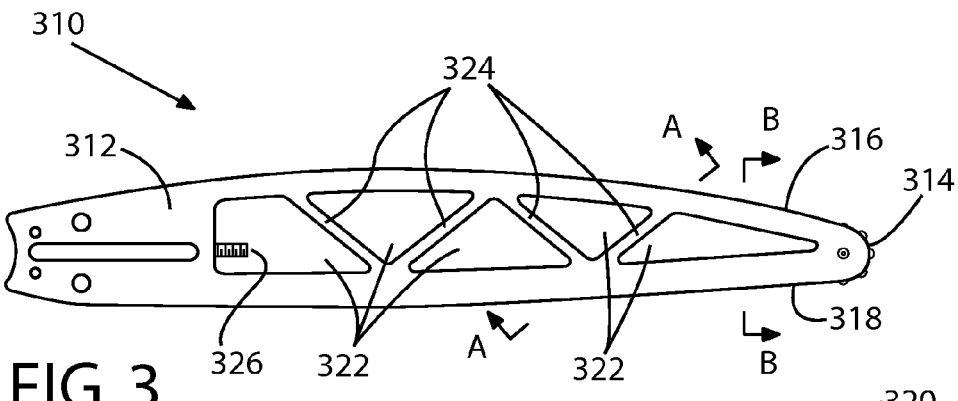
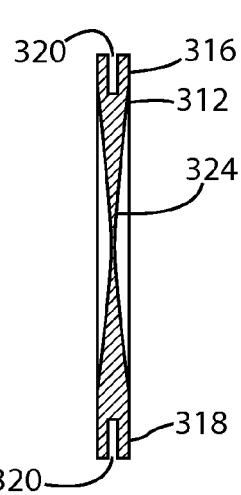
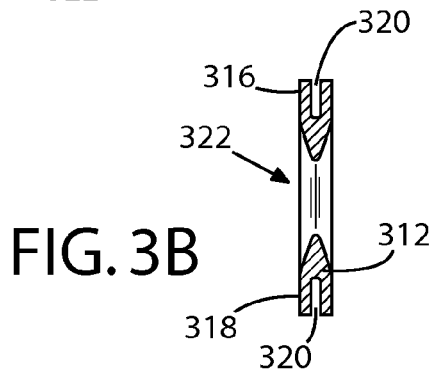
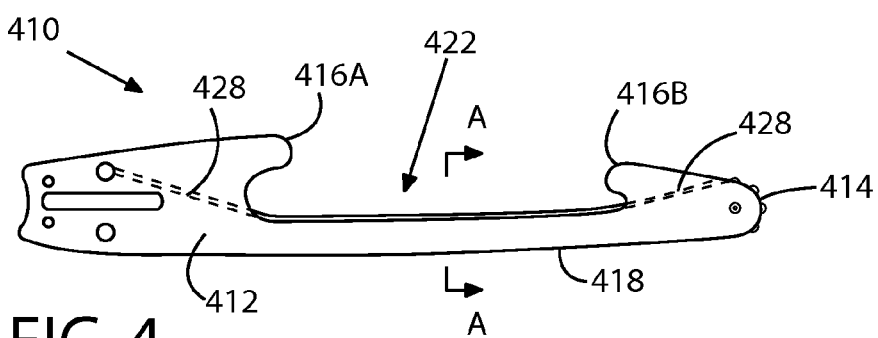
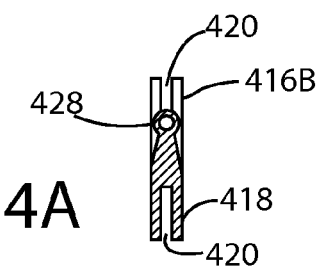

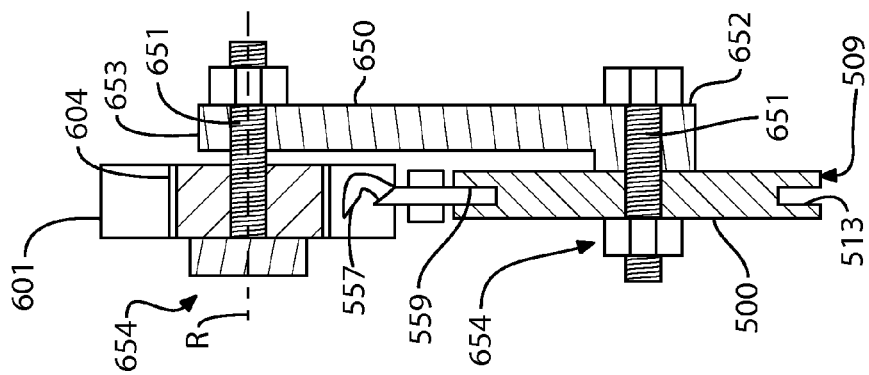
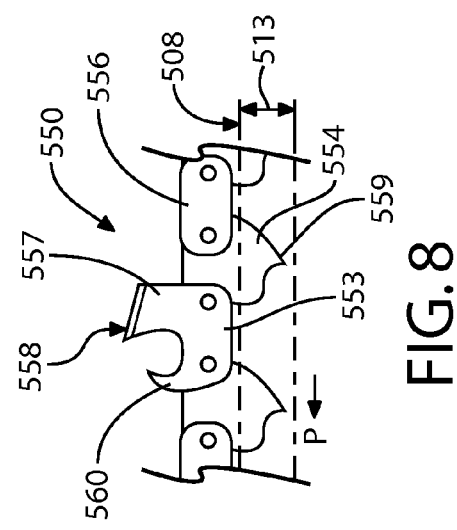
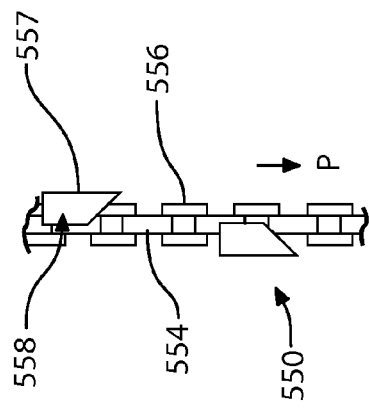
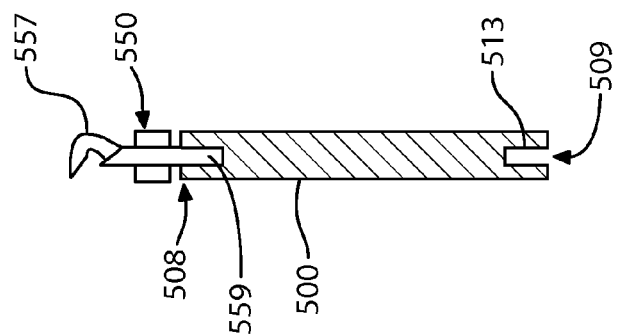
FIG. 10
FIG. 8
FIG. 9
FIG. 7

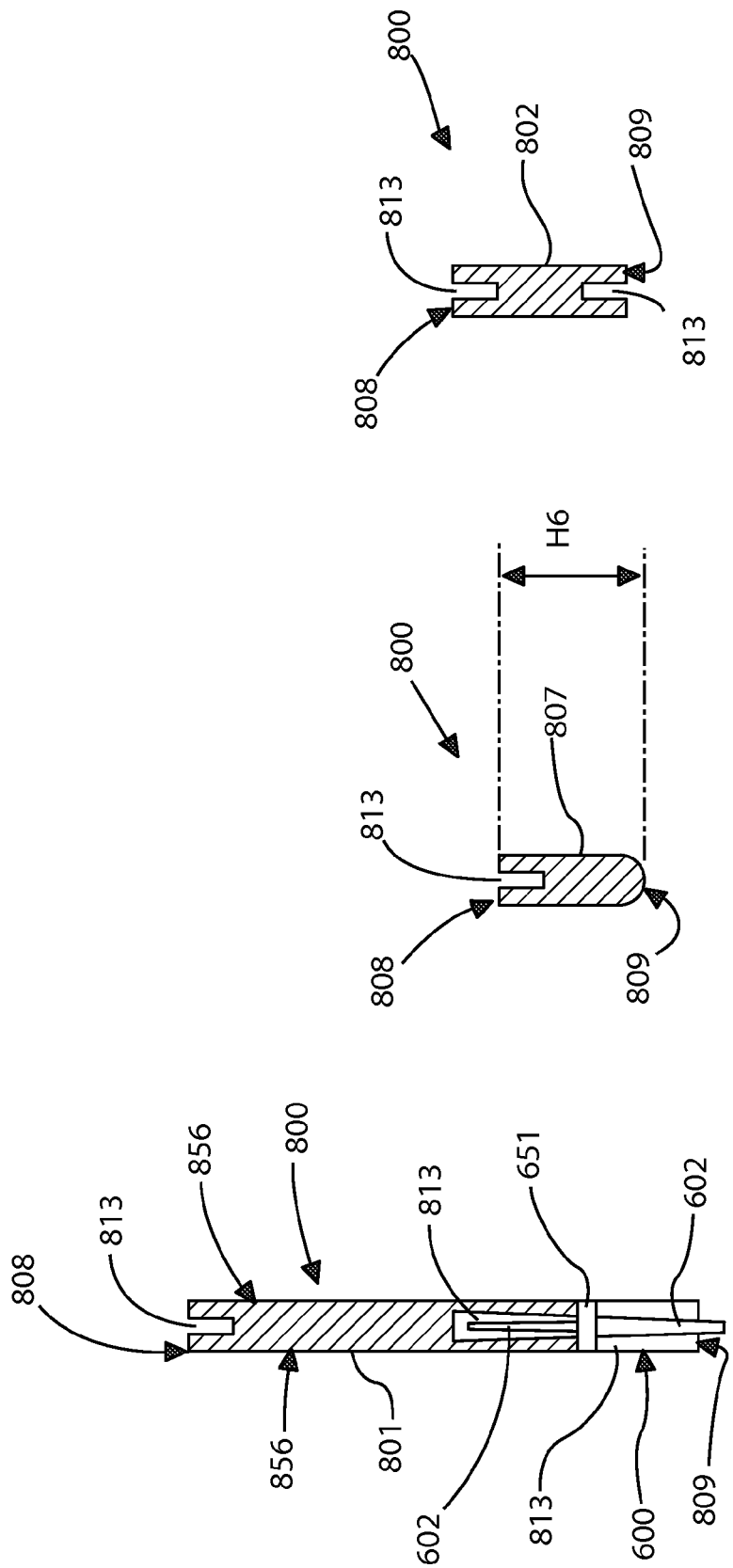

CHAINSAW CARVING GUIDE BAR

CROSS-REFERENCE TO RELATED APPLICATIONS

This application claims the benefit of and is a divisional of U.S. patent application Ser. No. 12/729,465 filed on Mar. 23, 2010, which is a continuation-in-part of U.S. patent application Ser. No. 11/784,420 filed on Apr. 6, 2007, the entire disclosures of which are incorporated herein by reference.

BACKGROUND OF THE INVENTION

This invention relates to a guide bar for a chainsaw for guiding a continuous loop of saw chain around the working end tip and back to the power unit to which it is mounted. More particularly, the invention relates to a chainsaw guide bar that is especially configured and adapted for executing fine details in an artistically carved wooden or similar workpiece via an improved guide bar of greatly reduced weight and structure in contrast to conventional commercially available guide bars. The invention therefore relates to a guide bar that is intended to be used for, and excels in, non-conventional artistic carving purposes, such as curvilinear carving and shaping with sharp radiused cuts, with great ease and efficiency.

Chainsaws have been used in the logging, lumber and wood processing industry for nearly 100 years. Chainsaws and their component parts have been designed to withstand the rigors of this industry. Resulting guide bar design has remained relatively bulky and heavy in nature to meet industry demands.

Since a chainsaw guide bar can comprise up to 25% of a chainsaw's weight, a reduction in guide bar weight can significantly reduce the overall weight of a chainsaw. Furthermore, since the guide bar extends some distance forward of the users hands, its weight is leveraged and over time produces a very tiring effect on the user. This tiring effect can increase the risk of accident and injury as well as reduce the amount of time a user can operate a saw.

In the past, several methods have been devised to lighten the chainsaw bar. All of them have utilized either a method of replacing areas of the solid body of the bar with inserts of a lighter weight material or by leaving hollow areas in the center plate or plane of a laminated bar or by making the width of the bar thinner or a combination of these methods. Chainsaw guide bars to this point in time have been fully planar along their working end, without any hollows or holes of any significant size.

One previously granted patent, U.S. Pat. No. 2,660,204 [Rosenboom] describes an adjustable chain saw bar that has a chain guiding track that is adjustable in width so that the working clearance can be easily maintained, cuts straight, and adds strength and rigidity to the bar. The drawbacks of this design are that it will not cut in a curved fashion. Further this type of chainsaw bar is not lightweight. Additionally, this guide bar cannot be used for non-conventional purposes, such as carving and shaping.

Another prior patent, U.S. Pat. No. 4,138,813 [Harada] describes a chain saw guide bar which is light weight and includes a pair of plates of small thickness each formed on the surface of the guide bar and forms a groove on each of their surfaces to increase the rigidity and strength of the guide bar. The drawbacks of this design are that it is a fully planar design, with no hollows or holes to lighten the chainsaw bar. Additionally, it is not capable of sculpting, carving, shaping or executing precise cutting of a small amount of wood or similar material such as ice, stone, composite material, bone, and food stuffs.

Another earlier apparatus is described in U.S. Pat. No. 4,654,972 [Sellmaier] as an elongate chain support blade that provides clearance between respective runs of the chain and longitudinal edges of the blade, thereby reducing friction and reducing oil usage. The drawbacks of this design are that it is not lightweight; and it does not contain any hollows or holes to lighten the chainsaw. Additionally, it contains a spur wheel and guide wheel at the front end of the blade. Moreover, it is designed for the purpose of cutting trees and not capable of sculpting, carving, shaping or executing precise cutting of a small amount of material.

Still several earlier devices describe chain saw guides which have cut-out sections filled with resin or some other non-metallic material to reduce the weight of the guide bar while still retaining rigidity. U.S. Pat. No. 4,837,934 [Krohn] describes a chain saw bar that defines an elongate open area within which is formed an insert member of a lightweight, non-metallic material. U.S. Pat. No. 5,014,435 [Date] describes a chain saw guide with an inner plate and a pair of outer plates fixed to the two flat sides of the inner plate. The inner and outer plates have holes that are filled with resin in order to lighten the weight of the saw but still maintain the rigidity. U.S. Pat. No. 5,025,561 [Sugihara] describes a guide bar for a chain saw with holes in the main body which contains a resin filler which would be shock-absorbing, weight-lightening in order to give rigidity to the guide bar and also cut down on vibrations. Finally, U.S. Pat. No. 5,035,058 [Date] describes a chain saw guide bar having oppositely located flat sides, with a plurality of recesses on each side and some recesses being filled with a lightweight material, while others function as oil reservoirs and oil passages between the guide grooves of the bar.

The drawbacks to these designs are the inserts or holes are filled with a non-metallic or resin material which are used solely for the purpose of stiffening and adding rigidity to the bar. Additionally, it is designed for users in the logging industry, so they are much larger than the present invention. Moreover, the guide bar is planar, and used for cutting in a straight line, and not capable of allowing for carving and sculpting small amounts of material.

Still other prior patents describe planar guide bars that contain longitudinal extending cutouts that are filled with a lighter weight material. U.S. Pat. No. 5,271,157 [Wieninger] describes a guide bar with two steel side parts and a center part connected to the side parts. Additionally, the guide bar contains cut outs in the side parts and in the center part of the guide bar extending in the longitudinal direction which are filled with a lighter material. U.S. Pat. No. 5,842,279 [Andress] describes a guide bar with a single steel plate, and a cut out extending over a portion of the longitudinal extension and over a portion of the height filled in with a casting material having a smaller density than the steel plate. The casting material is used for the purpose of adding a high torsional stiffness and lightening the weight of the guide bar. U.S. Pat. No. 6,427,342 [Breitbarth] describes a guide bar for a chain saw having an elongate planar body with an opening extending therethrough, and an elongate insert made from a lighter weight material to fit within the opening in the main body.

The drawbacks of these designs are that the guide bars have a great length and are more difficult to handle. Additionally, the guide bars are all planar. They all contain at least one main elongated cutout in the center of the guide bar, which then needs to be filled with a lighter weight material in order to add rigidity to the guide bar, so that it will cut steadily in a straight line. They are not capable of cutting in a curved manner. Moreover, these devices are made for larger scale industrial use. Additionally, it would not be capable of carving or sculpting small amounts of material.

In recent years, the appearance of alternate cutting applications has increased, due to the chainsaws continuing decrease in weight These alternate uses require more precise cutting of less material than traditionally required by a chain saw, thus, the guide bar strength is less of an important factor of its usefulness as is its reduction in weight. These alternate uses also require the freeform shaping of wood or similar material whereas the new bar designs ability to make curved cuts rather than straight cuts would greatly increase its usefulness as well as its maneuverability and ease of manipulation. These alternate uses include but are not limited to ornamental and architectural shaping as well as for furniture and sign making, timber frame and log construction applications and chain saw art and crafts.

Operating a chainsaw, for a purpose such as carving a statue or figure from wood is an extremely physically tiresome task. Not only does the chainsaw need to be supported in an infinite number of physical positions, but also constantly and forcefully manipulated in both random and repetitious manners. Since there is such a great deal of guide bar manipulation in the process of shaping wood or material, heavy guide bars are extremely cumbersome and wearing on the user, increasing risk of accident or injury and decreasing the carvers quality of workmanship as well as the time a carver can safely operate the chainsaw.

The carving and shaping of wood or other material often requires the shaping of concave and convex surfaces. Modern, standard chainsaw guide bars are designed to cut in a straight line. Obtaining such shapes with a guide bar that cuts straight is a tedious process. Narrow tipped guide bars are available and marketed to the carving industry; however, they are fully planar in design, restrictive to making radius and curved cuts and heavy, as they are constructed in the same manner as a guide bar designed for felling trees and sectioning logs.

SUMMARY OF THE INVENTION

The substance of this invention is to provide a chainsaw guide bar, generally under twenty inches in length, that meets the needs of a person using a chainsaw in order to sculpt, carve, shape, or execute precise cutting of a small amount of wood or similar material such as ice, stone, composite material, bone and food stuffs.

The new guide bar will be up to 50% lighter than presently manufactured guide bars of the same length. This significant reduction in weight benefits the user in multiple ways. By reducing the overall weight of the tool, you will increase the amount of time a user can safely operate a chainsaw. Secondly, because the guide bar protrudes some distance forward of a chainsaw users hands, its weight is leveraged, moreover, since the guide bar is in constant motion when shaping with a chainsaw. The process of repeatedly stopping and redirecting the guide bar and chain is very wearing on the user due to the inertia of a heavy bar. A lighter weight guide bar would have much less inertia and be much easier to manipulate increasing operator workmanship, effectiveness and lengthening the users' safe operating time.

The new guide bars will be able to execute the smallest radius cuts of any chainsaw guide bar. In the process of carving and shaping with a chainsaw, the ability to cut in curvilinear fashion is of great value. It has been the object of all prior art to cut in a straight line, whereas the new guide bars will be able to execute a three-inch radius curved cut through several inches of wood or similar material. The ability to make such cuts would significantly increase a chainsaw carver's efficiency and be of great value.

The new guide bar will easily be able to smooth large areas of material of a slight concave or convex shape by gliding the chain saw guide bar in a side to side motion. Whereas present guide bars have nearly straight guide rail edges, the new guide bars can have a convex guide rail edge to conform to concave shapes and/or a section of free chain edge to conform to convex shapes as opposed to present guide bars that will only conform to flat or nearly flat surfaces.

According to other aspects of the present invention, a guide bar is provided that is capable of making small radius curvilinear concave or convex cuts suitable for artistic carving. A chainsaw guide bar adapted for making small radius curvilinear cuts includes an elongated guide bar body including a peripheral guide rail slot configured to slidably engage a circulating saw chain, a broadened proximal mounting end defining a longitudinal axis and configured for mounting to a power drive unit, a distal working end, an intermediate cutting portion extending between the mounting and cutting ends, and an idler sprocket mechanism mounted above the guide bar body. The sprocket mechanism engages the saw chain and is operative to keep the chain engaged with the guide rail slot.

According to other aspects of the present invention, a guide bar is provided that is capable of contouring and rounding convex workpiece surfaces encountered in artistic carving. A chainsaw guide bar adapted for rounding and contouring workpiece surfaces includes an elongated guide bar body including a peripheral guide rail slot configured to slidably engage a circulating saw chain and extending at least partially around the guide bar, a broadened proximal mounting end defining a longitudinal axis and configured for mounting to a power drive unit, a narrow distal working end, and an intermediate portion extending between the mounting and cutting ends. The guide bar body defines a concave shaped and downwardly open elongated recess extending axially between the mounting and cutting ends that provides an unsupported flexible span of saw chain between the mounting and cutting ends. The saw chain is movable into and out of the recess between an undeflected position defining a first path and a deflected position defining a second path. An idler sprocket mechanism is rotatably disposed in the mounting end of the guide bar body preferably adjacent the elongate recess. The sprocket mechanism engages the saw chain and is operative to guide the chain into a portion of guide rail slot disposed on a bottom edge of the mounting end. The unsupported span of chain is operable to conform to a surface shape of a workpiece and round the surface.

In another embodiment, a chainsaw guide bar adapted for rounding and contouring workpiece surfaces includes an elongated guide bar body including a peripheral guide rail slot configured to slidably engage a circulating saw chain, a broadened proximal mounting end defining a longitudinal axis LA and configured for mounting to a power drive unit, a narrow distal working end, and an intermediate cutting portion extending between the mounting and cutting ends. The guide bar body defines a concave shaped and downwardly open elongated recess extending axially between the mounting and cutting ends that provides an unsupported flexible span of saw chain between the mounting and cutting ends. The saw chain is movable into and out of the recess between an undeflected position defining a first path and a deflected position defining a second path, wherein the unsupported span of chain is operable to conform to a surface shape of a workpiece and round the surface.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

The features of the preferred embodiments will be described with reference to the following drawings where like elements are labeled similarly, and in which:

FIG. 3 is a side view of the guide bar showing a plurality of weight relieving apertures that can be shaped in any manner of ways to serve for functional and/or aesthetic purposes;

FIG. 3A is a cross-sectional view taken along Line A-A of FIG. 3 showing guide rail edges top and bottom and hollow ground nature of the longitudinal section of the guide bar;

FIG. 3B is a cross-sectional view taken along Line B-B of FIG. 3 showing the inner edges of the weight-relieving aperture as being tapered to a blunt rounded edge to facilitate a smooth passage over material being cut;

FIG. 4 is a side view showing the guide bar possessing a standard mounting end but only one longitudinal guide rail edge for the length of the bar from mounting end to the tip;

FIG. 4A is a cross-sectional view taken along Line A-A of FIG. 4 showing guide rail at bottom and fluid transfer tube on top;

FIG. 7 is a cross-sectional view of the guide bar taken along line 7-7 in FIG. 5;

FIG. 8 is a side view of a saw chain useable with the guide bars according to the present invention;

FIG. 9 is a top view thereof;

FIG. 10 is a cross-sectional view of the guide bar taken along line 10-10 in FIG. 5 through the idler sprocket mechanism and showing a first mounting bracket embodiment;

FIG. 32 is a cross-sectional view of the guide bar of FIG. 31 taken along line 32-32 therein;

FIG. 33 is a cross-sectional view of the guide bar of FIG. 31 taken along line 33-33 therein;

FIG. 34 is a cross-sectional view of the guide bar of FIG. 31 taken along line 34-34 therein;

Figure 1:
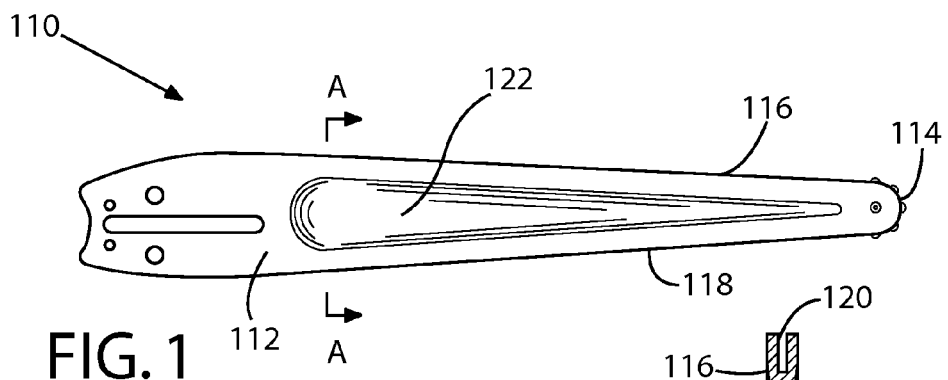
FIG. 1 is a side view of the guide bar with a solid body and sprocket tip showing guide rail edges top.

All drawings are schematic and not actual physical representations of the articles, components or systems described herein, and are further not drawn to scale. The drawings should be interpreted accordingly.

The opposite sides of all guide bars shown in the figures herein are identical and mirror images of the guide bars depicted.

DETAILED DESCRIPTION

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features; the scope of the invention being defined by the claims appended hereto.

In the description of embodiments of the invention disclosed herein, any reference to direction or orientation is merely intended for convenience of description and is not intended in any way to limit the scope of the present invention. Moreover, the features and benefits of the invention are illustrated by reference to preferred embodiments. Accordingly, the invention expressly should not be limited to such preferred embodiments illustrating some possible but non-limiting combination of features that may be provided alone or in other combinations of features; the scope of the invention being defined by the claims appended hereto.

Referring now to the drawings in detail, where like numerals refer to like parts or elements, there is shown the new guide bar designs of the present invention. The new improved guide bar design is not so much a change in present guide bar manufacturing processes, but a change in structure, shape, weight, and use for specific adaptation to artistic carving of wood or other similar materials amendable to carving with a chainsaw. The new guide bars may be solid, laminate, or composite in material. They may have hardened, alloy, or sprocket tips and may or may not contain adjusting mechanisms to tension the saw chain and may or may not have fluid transfer systems to service the guide bar and saw chain.

Nearly all presently available guide bar design incorporates a fully planar design. The structural design maintains the guide bar in a substantially rigid configuration such that the guide bar remains in a single plane regardless of varying external or edge dimensions. The new guide bar of the present invention has been altered to enhance both the cutting and carving ability by altering its dimensions and its structural configuration. This will either permit flexure of the body of the guide bar by a number of different means such that the guide bar can flex away from the substantially rigid single planar configuration or the capacity of the guide bar to permit the saw chain to vary from its restricted path for enhanced carving and reduced radial cutting capabilities. Each of the following embodiments of various constructions of guide bars have similar nominal dimensions: eight inches to twenty-two inches in overall length and three to four inches in overall height. Variations of these dimensions will be discussed below, as required.

Figure 1A:
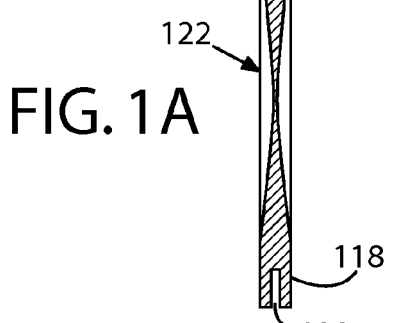
FIG. 1A is a cross-sectional view taken along Line A-A of FIG. 1 showing guide rail edges top and bottom and hollow ground nature of the longitudinal section of the guide bar.

In a first embodiment of the invention, the planar surfaces of the new guide bar 110 have been hollow ground to both lighten the bar and to facilitate the user's execution of a decreased radius curved cut, enhancing the new guide bars carving ability. This embodiment provides the greatest structural strength and guide bar rigidity. The guide bar 110, as shown in FIG. 1, is one having a solid elongate body 112 and a distal end sprocket tip 114. The body 112 encompasses the length of the guide bar 110 including a top longitudinal guide rail 116 and a bottom longitudinal guide rail 118 extending outward to the sprocket tip 114. FIG. 1A displays a cross-section of the guide bar 110 showing the top and bottom guide rails 116, 118 and the extent of the hollow ground portion 122 of the elongate longitudinal section of the guide bar 110. The top longitudinal guide rail edge 116 and bottom longitudinal guide rail edge 118 each have a guide rail slot 120, which allows the saw chain to fit onto and ride within and along the guide rail slot 120. The hollow ground portion 122 permits the guide bar to conform around much tighter radius cuts for carving and finishing work pieces. The hollow ground portion 122 tapers toward the tip 114, as does the overall height dimension of the guide bar 110.

Figure 2:
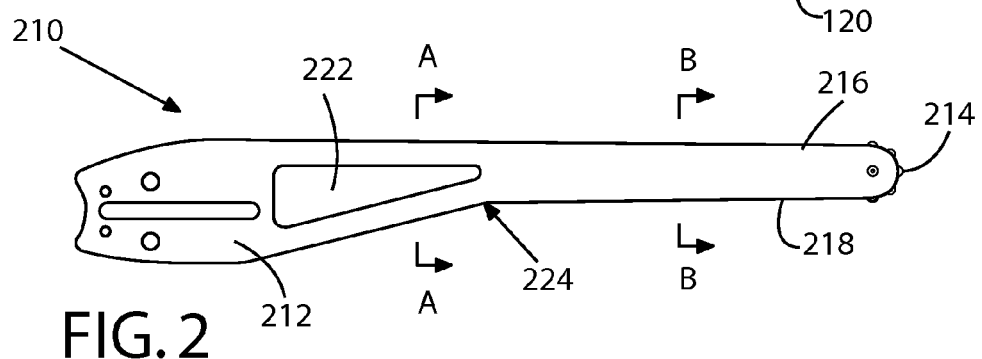
FIG. 2 is a side view of the guide bar and a weight-relieving aperture therethrough to lighten the guide bar and reduce the overall weight of the saw.
Figure 2A:
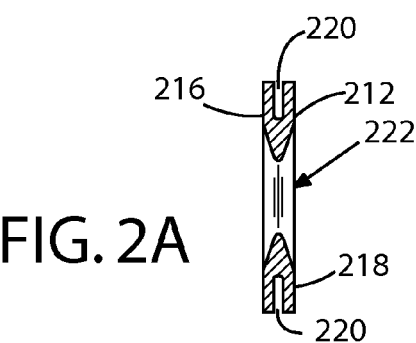
FIG. 2A is a cross-sectional view taken along Line A-A of FIG. 2 showing the inner edges of the weight relieving aperture as being tapered to a blunt rounded edge to facilitate a smooth passage over material being cut.
Figure 2B:
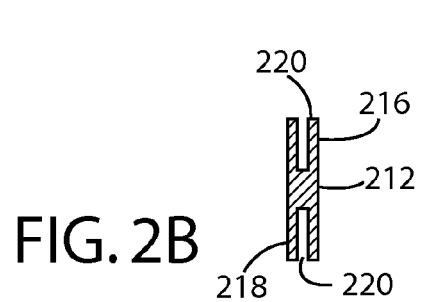
FIG. 2B is a cross-sectional view taken along Line B-B of FIG. 2 showing the longitudinal guide rail set parallel with the top longitudinal guide rail at a minimum distance apart with the bottom portion of the bar concavely shaped.

In a second embodiment shown in FIG. 2, the guide bar 210 has a weight-relieving aperture 222 therethrough to lighten the guide bar and reduce the overall weight of the saw. The elongate body 212 encompasses the aperture 222 positioned towards the rear of the guide bar 210 and extends forward, after the aperture 222, in a reduced height of approximately two inches, and more preferably one inch ending at the sprocket tip 214. FIG. 2A shows the proximal end of the guide bar 210 with its sidewalls tapering inward toward the weight relieving aperture 222, which taper terminates in a rounded joint as the two sidewalls merge in order to facilitate a smooth passage over the material being cut. The top longitudinal guide rail 216 and bottom longitudinal guide rail 218 each have a guide rail slot 220, which allows the saw chain to fit onto and ride along the guide rail slot 220. FIG. 2B shows the distal end of the elongate body 212 of the guide bar 210 with the top longitudinal guide rail 216 and the bottom longitudinal guide rail 218, both with the guide rail slot 220. The guide bar 210 has been dimensioned at its distal end to a minimum size of approximately two inches in height, and more preferably one inch, commensurate with the size of the chain being utilized of either ¼ or ⅜ inches, to minimize the radius curvilinear cut achievable.

To provide for enhanced carving and contouring of a work piece, the bottom portion 224 of the guide bar 210, where the proximal and distal portions are joined, has been shaped in a substantially concave configuration resulting in the saw chain being untensioned along that surface. Although there is a difference in the overall height dimensions of the proximal and distal portions of the guide bar 210, the top and bottom longitudinal guide rails 216, 218 continue to be in a parallel plane with each other, with the distance between them set at a minimum distance apart at the tip 214.

Cutting with a chainsaw fitted with the guide bar 210 of this embodiment and engaging the bottom or returning run of the saw chain into wood or similar material of the work piece in the area of the joint between the bottoms of the proximal and distal portions of the bottom guide rail 218, pressure will be exerted upon the saw chain by the work piece that will entrain the return run of saw chain into the guide rail slot 220 of the bottom guide rail 218 of the guide bar 210. This structural configuration will afford the smallest height profile possible for the guide bar 210 and saw chain and allow for the minimum radius curved cut achievable, for the preferred size of saw chain being utilized.

A third embodiment of the invention is shown in FIG. 3. The guide bar 310 is shown with a plurality of weight relieving apertures 322, which apertures can be shaped and dimensioned in any manner of ways to serve a number of functional and/or aesthetic purposes. The third embodiment of FIG. 3 displays an elongate body 312 that extends the length of the guide bar 310 and includes the plurality of apertures 322 terminating in the sprocket tip 314. Because of the small amount of material these guide bars 310 are designed to cut, generally less than six inches, depending on density, the guide bar 310 mounting or proximal end will rarely, if ever, be utilized. A hollow section within the frame of the guide bar 310 affords space for a mounting apparatus, such as a threaded rod 326, for connecting attachments for functional and/or aesthetic reasons, such as a light or nameplate. The threaded rod 326 is shown mounted inside one of the weight-relieving aperture 322, adjacent to the mounting end of the guide bar 310.

FIGS. 3A and 3B each display a different cross-section of the guide bar 310. FIG. 3A shows the sidewalls of the weight relieving apertures 322 tapering inward and terminating in a rounded joint as the two sidewalls merge in order to facilitate a smooth passage over the material being cut. Thus, each of the structural spokes 324 between the several weight-relieving apertures 322 are hollow ground and tapered to a rounded edge to facilitate a smooth passage over material being cut. The plurality of apertures 322 and their respective struts 324 serve to retain the top and a bottom longitudinal guide rails 316 and 318, respectively, in a parallel relationship as displayed in FIG. 3B. As in the previously described embodiments, the top guide rail 316 and bottom guide rail 318, each have a guide rail slot 320, which slot allows the chain to fit onto and ride along the guide rails of the bar 310.

The weight relieving apertures 322 serve not only to lighten the guide bar 310, but also to facilitate a reduced radius curved cut due to the special dimensioning and hollow grinding of the struts 324 such that the guide bar 310 will exhibit a slight flexure along the top guide rail 316 when stressed during cutting or carving. The top longitudinal guide rail 316 is partially convex in shape along its longitudinal dimension and is designed to flex across a small angle, laterally and out of parallel with the bottom guide rail 318, to further augment curvilinear cutting. When engaged in cutting an amount of material equal or less than one third the length of the guide bar 310 and cutting said material with the center section of the length of the bar 310 as the bar 310 is forced through the kerf of a curved cut. Longitudinal torque applied to the guide bar 310 by the operator in order to make a curved cut will bend the top longitudinal guide rail edge 316 away from its aligned parallelity in order to follow the bottom longitudinal guide rail edge 318 through a curvilinear kerf of a smaller radius than that of a guide bar that had a rigid top guide rail. The convex shape of the top rail 316 will also allow the user to conform a significant length of saw chain to a concave surface for the purpose of creating or smoothing a surface.

In the fourth embodiment of FIG. 4, the guide bar 410 possesses a standard mounting end and an elongate body 412, but only one complete longitudinal guide rail extending the length of the guide bar from mounting end to the sprocket tip 414. The reduced structure guide bar 410, in comparison to commercially available bars is greatly reduced in weight by the elimination of the greater portion of the top longitudinal guide rail 416, yet retains sufficient structural integrity commensurate to the light duty cutting and carving for which these guide bars are designed. Interposed between the proximal and distal portions of the top longitudinal guide rail 416A, 416B, respectively, is an extended aperture 422. The aperture 422 extends more than halfway into the guide bar 410 reducing the elongate body 412 to a reduced height along the bottom of the guide bar 410. The aperture 422 also spans a substantial longitudinal portion of the guide bar 410 such that the chain lubricating tube 428 must be relocated in the upper part of the elongate body 412 as more clearly shown in FIG. 4A. The chain lubricating tube 428 is mounted along the top longitudinal edge of the elongate body 412 and commuting with standard attachment holes to facilitate fluid transfer through guide bar 410 from the chainsaw power unit to service the guide bar 410 and saw chain. FIG. 4A, a cross-sectional view of FIG. 4 looking toward the tip 414, shows the elongate body 412 with the chain lubricating tube 428 located on top thereof. The top longitudinal guide rail portion 416B extends upward to grasp and guide the saw chain as the chain is recaptured after traversing over the aperture 422. As in the previous embodiments, the top longitudinal guide rail 416 and bottom longitudinal guide rail 418 each have a guide rail slot 420.

The usefulness of this embodiment is further enhanced over prior chainsaw devices by the unengaged run of saw chain traveling from the elongate body 412 to guide bar tip 414 over the extended aperture 422. This untensioned portion of saw chain will allow a user the ability to conform a significant section of unsupported saw chain to a convex shape for smoothing a work piece of virtually any shape in an efficient and effective manner. Further, the reduced height of the elongate body 412 of the guide bar 410 in the central portion of the guide bar 410 encompassed by the extended aperture 422 will enable a guide bar having this construction to achieve will afford a much smaller height profile for the guide bar 410 and saw chain and allow for the minimum radius curved cut achievable, for the preferred size of saw chain being utilized. Also, the absence of the top guide rail 416 across an extended portion of the guide bar 410 will also allow the user to conform a significant length of saw chain to a concave surface for the purpose of creating or smoothing a surface. The guide bar 410 and chain will also remain cooler than that of a conventional guide bar 410 due to a reduction in friction as the chain runs free over a significant portion of the elongate body 412 as there does not exist a top longitudinal guide rail over the extended aperture 422.

Precision Curvilinear and Contour Cutting Guide Bars

According to other aspects of the invention, improved chainsaw guide bars are provided that are especially adapted for making some of the specialized types of cuts frequently encountered for artistic carving of sculptures and decorative objects (see, e.g., FIG. 21) from wood or other type materials amenable to cutting with a chainsaw. Conventional chainsaw guide bars heretofore have failed to provide artisans with guide bars capable of expediently making these specialized cuts. One such type of specialized cut is a small radius curvilinear cut needed to create features such as arcuate concave or convex surface features forming an arc (i.e. less than 360 degrees in circumference), or a complete 360 degree arcuate surface forming a generally circular or oblong hole (e.g. oval or ellipsoidal) made in an interior portion of the workpiece. Such arcuately shaped curvilinear cuts preferably should further be capable of being made with a generally consistent and constant diameter or radius of curvature for the full depth of the feature which may be of considerable length especially for large sculptures.

Figure 24:
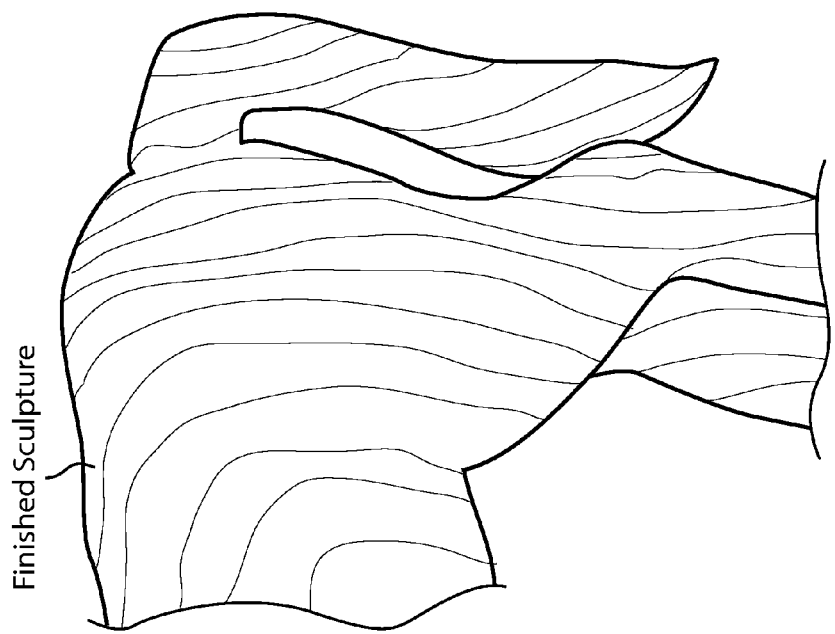
FIG. 24 is a side view of the finished rear quarter of a decorative sculpture or object.
Figure 25:
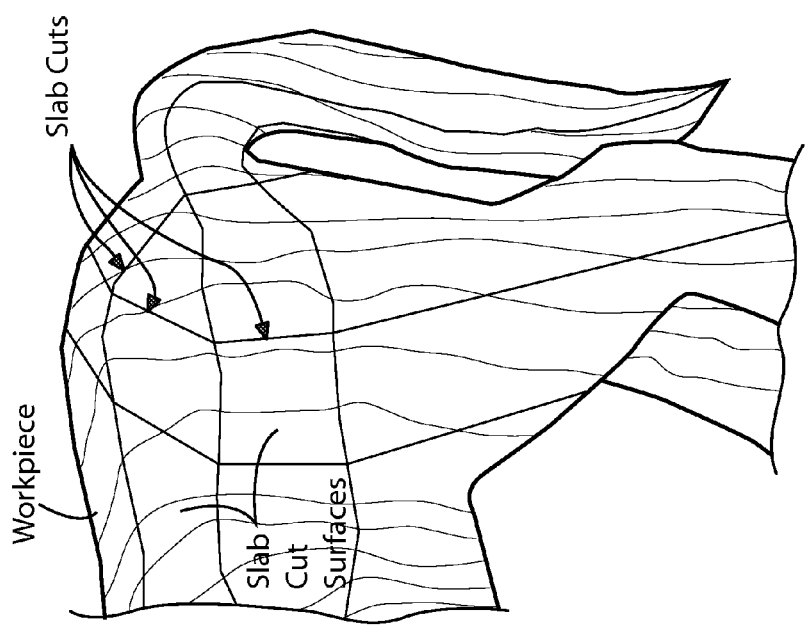
FIG. 25 shows the initial block and slab cuts made in a workpiece in carving the sculpture or object of FIG. 24.

Another type of specialized curvilinear cut frequently encountered in artistic sculpture carving with a chainsaw is an arcuate convex surface generally formed on the exterior portion or surfaces of the workpiece having a smoothly rounded or contoured profile when completed, such as shown in FIG. 24 and further described herein.

Conventional chainsaw guide bars are incapable of making the foregoing curvilinear cuts and features, thereby requiring multiple cuts to be made for just rough cutting the intended final profile and then additional time consuming finishing steps using auxiliary manual or powered wood shaping tools such as chisels, sanders, power drills with wood shaping burr bits, and similar.

Improved guide bars and chain guidance systems according to embodiments of the present invention to now be described below enables small radiused curvilinear surfaces to be made in most instances using the chainsaw alone, and largely eliminates or minimizes the need for additional cutting steps and/or finishing tools. This provides the carver or user with more versatile chainsaw guide bars particularly adapted for carving artistic sculptures or for use in other applications requiring precision curvilinear cuts or contouring. In various embodiments, the present invention provides a curvilinear carving or cutting guide bars (see, e.g. guide bars 500 and 530, FIGS. 5 and 6) and a contour carving or cutting guide bar (see, e.g. guide bars 800, 900, and 950, FIGS. 31, 35, and 36) as described below.

Curvilinear Cutting Guide Bars

Figure 5:
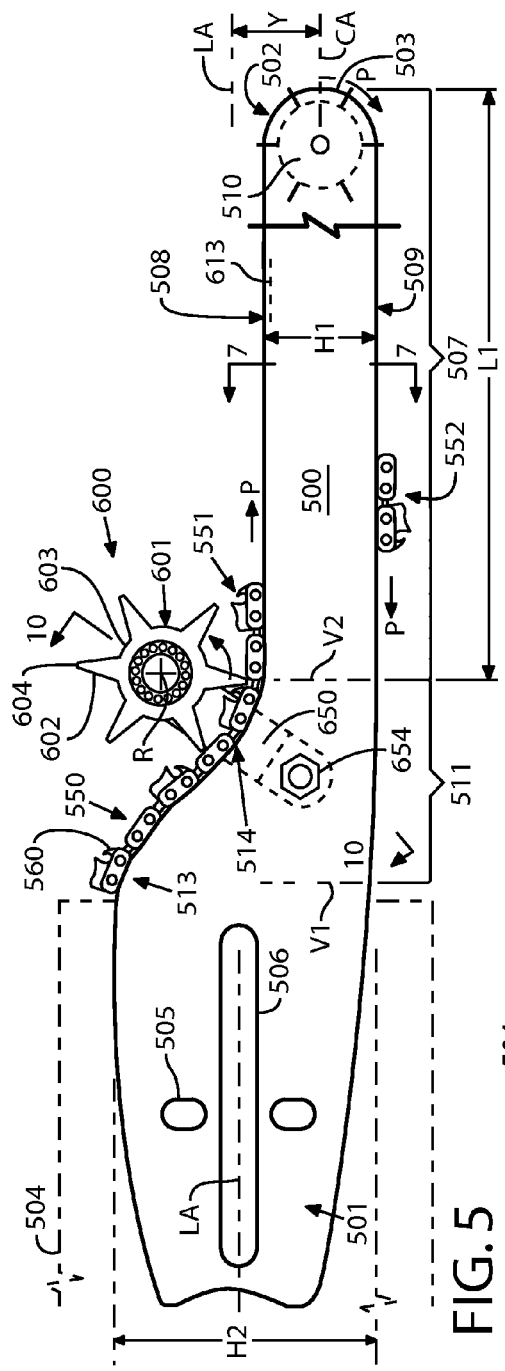
FIG. 5 is a side view of a curvilinear cutting guide bar with idler sprocket chain guide mechanism according to another aspect of the present invention.

Referring now to FIG. 5, a curvilinear cutting guide bar 500 according to one embodiment of the present invention permits both much smaller radius curvilinear cuts to be performed with chainsaws than prior conventional chainsaw guide bars while simultaneously providing improved chain control and guidance by keeping saw chain substantially entrained with the guide bar for improved stability and reduced chain wear. The guided chain movement, in combination with the unique guide bar configurations disclosed herein, are advantageous for making precision artistic shapes and contours in a decorative wooden or other type workpieces whereas such precision cutting is largely irrelevant to making rough straight cross cuts in wood using conventional chainsaw guide bar designs for tree harvesting and pruning, cutting firewood, and cutting logs or other large wooden structural beams or columns to length such as in fabricating timber frame or log buildings or similar structures.

The unique shape and construction of guide bar 500 further enables sharp radius curvilinear cuts including arcs and full circular holes to be executed for substantially the entire insertion depth of the working or cutting portion of the guide bar when inserted into a wooden workpiece. This advantageously allows deep sharply radiused curvilinear arcs or holes having a relatively uniform shape to be made with a conventional chainsaw power unit equipped with a wood-carving guide bar 500 according to the present invention. Accordingly, cylindrically-shaped holes may be made having a relatively constant diameter for the full depth of the cut. In addition, such sharply radiused curvilinear cuts and shapes may be made in either cutting direction, utilizing both the outward run 551 of saw chain 550 (i.e. along the top of the guide bar) or the return run 552 of the chain (i.e. bottom of the guide bar), as further described herein.

Although wood carving bars are known having a gradually narrowing and tapered tip, these guide bars can only make conically shaped holes because the bar broadens back towards user and proximal mounting end thereby increasing the minimum radius that can be cut (see, e.g. FIG. 17) as the bar is further plunged into the workpiece.

Since the mounting end height of a guide bar is fixed by the mechanical parameters of present chainsaw power units to which the guide bars are attached, the cutting ability of conventionally broad (i.e. high) guide bars to execute sharply radiused cuts particularly with great depth is severely limited. As shown in a preferred embodiment of a guide bar 500 in FIG. 5, by altering the shape of the peripheral guide rail slot 613 and utilizing an idler or guide sprocket mechanism 600 that is preferably mounted above guide bar 500 proximate to the power unit mounting end of the guide bar to keep the saw chain entrained in the rail slot, the guide bar height advantageously can be minimized greatly resulting in an artistic wood-carving chainsaw that operates more like a scroll or saber saw capable of small radius curvilinear cutting rather than a conventional chainsaw mostly effective for making straight crosscuts or flat slab cuts which are largely unsuitable for executing the type of fine finished curvilinear detail carving needed for a decorative sculptures or objects.

Referring now to FIG. 5, a chainsaw with guided saw chain adapted for making small radius curvilinear cuts according to the present invention includes a longitudinally-extending guide bar 500 having an elongated planar body defining a longitudinal axis LA and including a broadened proximal rear mounting end 501 and a narrower opposite distal front working or cutting end 502. Mounting end 501 is adapted and sized for mounting to a conventional power drive unit 504 (represented schematically only in dashed lines) as will be well known to those in the art. Examples of such conventional power drive units are shown in U.S. Pat. Nos. 5,813,123, 6,964,101, and 7,200,941, all of which are incorporated herein by reference in their entireties. Power drive units 504 typically include a trigger actuating mechanism for controlling a combustible fuel driven engine or electric motor equipped with a drive shaft coupled to a rotating chain drive clutch-wheel mechanism which moves the saw chain. The chain drive clutch wheel mechanism is axially aligned with the mounting end 501 of guide bar 500 within the housing of the power drive unit and circulates the saw chain around the guide bar.

Opposite distal working or cutting end 502 of guide bar 500 may terminate in a generally rounded shaped tip 503 adapted for maintaining sliding guided engagement with the cutting or saw chain 550 in preferred embodiments, as further described herein.

The size and configuration of mounting end 501 of the guide bar 500 is largely fixed and dictated by the size and mechanical constraints of the power drive unit 504 to which it is fit. Mounting end 501 may include a conventional mounting slot 506 and oil holes 505 which communicate with chain guide rail slot 613 (see, e.g. FIG. 5) for lubricating saw chain 550. Slot 506 conventionally receives therethrough one or two bolts (not shown) which are part of the chain drive mechanism of power unit 504 and are used for adjusting the position of guide bar 500 and tension chain 550. Other mounting and adjustment holes may be provided.

Figure 6:
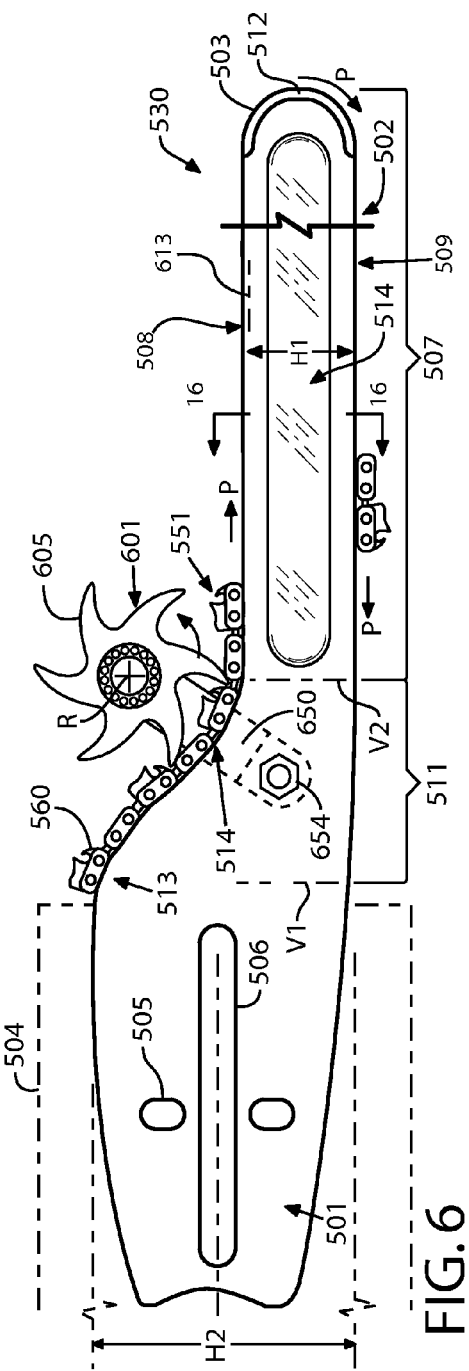
FIG. 6 is an alternative embodiment of the guide bar of FIG. 5.

With continuing reference to FIG. 5, guide bar 500 includes a top longitudinal guide rail edge 508 and a bottom longitudinal guide rail edge 509 both of which are configured and adapted for slidably engaging and guiding a circulating cutting or saw chain 550 as shown. Guide bar 500 thus includes a peripheral chain guide groove or slot 613, which preferably extends along top and bottom guide rail edges 508, 509 and around tip 503. Top guide rail edge 508 guides an outward run 551 of saw chain 550 from power drive unit 504 and bottom guide rail edge 509 guides a return run 552 of the chain as indicated by the chain directional arrows shown. The saw chain 500 is guided around the distal working end 502 by a generally rounded or circular circumferential tip 503 defining an arcuately shaped distal edge guide edge as shown in FIG. 5. In some embodiments, as shown, a rotatable end sprocket 510 may be disposed within tip 503 on distal end 502 of guide bar 500 to assist in guiding chain 500 around the cutting end 502 of guide bar 500 and reduce chain wear at the tip. In other possible embodiments, however, the sprocket may be omitted. In some embodiments, as shown in FIG. 6, tip 503 of guide bar 500 may include a hardened steel or other metal alloy edge 512 which preferably extends circumferentially around the tip to reduce wear of the guide bar tip itself.

With continuing reference to FIG. 5, chainsaw guide bar 500 includes an intermediate working or cutting portion 507 disposed between proximal mounting end 501 and distal cutting end 502 with the cutting portion preferably being contiguous with the mounting and cutting ends. Cutting portion 507 has an effective cutting length L1 and cutting height H1. In preferred configurations, distal cutting end 502 has a cutting height that is approximately equal to cutting height H1 as shown. Preferably, cutting portion 507 has a substantially uniform and constant cutting height H1 over substantially the entire effective cutting length L1.

Cutting portion 507 is operative to make cuts in a wooden or other workpiece having a maximum depth of penetration that matches substantially the majority of, and more preferably substantially the entire effective cutting length L1 of the cutting portion. To accomplish this, as shown in FIG. 5, the top and bottom longitudinal edges 508, 509 of cutting portion 507 are preferably oriented substantially parallel to each other and substantially narrower in height than adjoining mounting end 501 of guide bar 500, as shown in a preferred embodiment. In some embodiments, cutting portion 507 has an effective cutting height H1 that is preferably about one-half or less than the height H2 of the mounting end 501 of guide bar 500, and even more preferably about one-third or less than one-third height H2. Typical standard heights H2 of mounting end 501 required for attachment to conventional chainsaw power drive units 504 are about 1¾ inches for a relatively small conventional chainsaws and about 2¾ inches for a large saw.

As shown in FIG. 5, a reducing transition section or portion 511 is defined on guide bar 500 between mounting end 501 and cutting portion 507 which provides a reduction in height therebetween. In one embodiment, transition portion 511 has a downward sloping and preferably curvilinear compound shaped top guide rail edge 508 and a relatively longitudinally straight bottom guide rail edge 509 approximately aligned axially parallel to bottom guide rail edge 509 in the cutting portion 507 of guide bar 500 as shown. Transition portion 511 is delineated and begins near an imaginary point or vertical line V1 on guide bar 500 where mounting end 501 has a maximum or nearly maximum height H2 preferably just forward of power drive unit 504 housing and terminates at an imaginary point or vertical line V2 where the cutting portion 507 begins. The demarcation point for vertical line V2 thus coincides with the proximal starting end or point where cutting portion 507 begins on guide bar 500, which is further defined as the point where top and bottom guide rail edges 508, 509 begin to run longitudinally parallel to each other, as shown in FIG. 5.

In a preferred embodiment, transition portion 511 of guide bar 500 includes a top guide rail edge 508 defining both a convex edge surface 513 and a contiguous adjacent concave edge surface 514. Concave surface 514 is preferably disposed adjacent cutting portion 507 of guide bar 500. Surfaces 513 and 514 are contoured smoothly to keep saw chain 550 entrained within guide rail slot 613. In preferred embodiments, concave surface 514 may approximate an arc of a circle having its center point generally coinciding with axis of rotation R of a sprocket mechanism 600, as shown in FIG. 5 and further described herein.

In some representative preferred embodiments, without limitation, cutting portion 507 of guide bar 500 may have exemplary preferred effective cutting lengths L1 of about 6-22 inches, and more preferably about 8-18 inches, and a corresponding effective cutting height H1 of about 2 inches or less, more preferably less than about 1½ inches, and most preferably 1 inch or less in order to effectively carve small radius curvilinear cuts in a workpiece for artistic carving. A preferred range of heights H1 is from about and including ¾ inch to about and including 1⅜ inches. In one preferred embodiment of a guide bar 500 for making extremely small radius cuts, cutting portion 507 may have a height H1 of approximately ¾ inches. These effective cutting heights H1 allow cutting portion 507 of guide bar 550 to achieve the small radius curvilinear cuts highly desirable for artistic carving or other applications. Typical lateral thicknesses for guide bar 500 may be at least about 3/16 inch or more depending on the thickness of saw chain 550 used. The foregoing illustrative dimensions may vary by 1/16 due to manufacturing tolerances/variations.

In preferred embodiments based on the foregoing exemplary size ranges, therefore, cutting portion 507 of guide bar 500 may have an aspect ratio L1:H1 (defined for purposes of description herein as L1/H1) equal to or greater than 8:1, more preferably equal to or greater than 10:1, and most preferably in some embodiments equal to or greater than 18:1. These aspect ratios provide a guide bar cutting portion 507 suitable for artistic carving and other work having a sufficient length for penetrating the workpiece to a necessary depth to carve curvilinear surface features, yet advantageously with a corresponding ability to execute small radius curvilinear concave and convex cuts at those depths attributable to a relatively small height H1. Preferably, the aspect ratio does not exceed about 30:1 in preferred embodiments since it is desirable that the effective cutting height H1 of cutting portion 507 gradually increase with increased length L1 to ensure that the guide bar 500 is not so thin that resistance to bending and torsion are compromised.

In one exemplary embodiment, as shown in FIGS. 5 and 6, guide bars 500, 530 may preferably have an asymmetrical shape as shown with one of the top or bottom guide rail edges 508 or 509 of cutting portion 507 substantially axially aligned with a corresponding bottom guide rail edge 509 of the mounting end 501 of the guide bar (except for minor variations in the shape of the mounting end as best illustrated in FIG. 5). Accordingly, cutting portion 507 is preferably offset either above or below a longitudinal axis LA defined by mounting end 501 of guide bar 500 as shown with a cutting axis CA defined by the longitudinal centerline of cutting portion 507 being offset by a vertical distance Y from the longitudinal axis. In preferred embodiments and orientation of guide bar 500 shown in FIGS. 5 and 6, cutting portion 507 is offset below longitudinal axis LA with bottom guide rail edge 509 being substantially axially aligned with a corresponding bottom guide rail edge of mounting end 501. In some representative exemplary embodiments, Y preferably may be at least about 7/16 inches to about and including 7/8 inches.

It will be appreciated in some alternative embodiments (not shown), cutting portion 507 may be axially aligned with the longitudinal axis LA of guide bar 500 so that cutting axis CA coincides with longitudinal axis LA. In this case, top and bottom guide rails edges 508, 509 are each offset by a distance Y from the corresponding top and bottom guide rail edges 508, 509 formed on mounting portion 501, respectively. Such a symmetrical curvilinear cutting guide bar may include both a top and bottom sprocket mechanism 600 as described herein and shown in FIG. 5 to keep saw chain 550 entrained in guide rails slots 613 on both the top and bottom of cutting portion 507. Although not shown, such an arrangement will be clear to those skilled in the art based on FIG. 5 and associated description provided herein.

Referring to FIGS. 7-9 now, an embodiment of a conventional saw chain 550 usable with guide bar 500 is shown. Saw chain 550 includes cutting links 557 having a base portion 553 with upwardly extending cutters 558 and cutter depth gauge protrusions 560 projecting upwards therefrom, drive links 554 having a downward projecting guide portion or tang 559 mutually configured and dimensioned for sliding movement within a guide rail slot 613 (see also FIG. 5) provided in the periphery of guide bar 500, and tie straps or links 556 coupling the drive and cutting links together as shown. As best shown in FIG. 9 depicting a conventional three section chain, the drive links 554 are arranged longitudinally in a continuous manner and interspersed centrally between outer pairs of tie links 556 or tie link 556-cutting link 557 combinations. Cutters 558 project upwards from cutting link 557 and are typically L-shaped (best shown in FIG. 7) with an angled leading cutting edge as shown in FIG. 9. In conventional fashion, chain 550 may include a combination of both right and left facing cutters 558 which typically are alternated in the chain as best shown in FIG. 9. Cutter depth gauge protrusion 560 sets the depth at which the cutters 558 will penetrate the workpiece. Saw chains 550 are typically fabricated from alloy steel with hardened or chromed cutters 558. The cutting, drive, and tie links are typically riveted together to form a flexible chain. Suitable saw chains usable with a guide bar according to embodiments of the present invention are commercially available from Carlton® Company of Milwaukie, Oreg. and other manufacturers.

Referring to FIGS. 5 and 7-9, guide bar 500 further includes a longitudinally-extending peripheral chain guide rail slot 613 to guide and keep saw chain 550 substantially engaged with the guide bar as the chain circulates around the periphery of the bar. Chain guide rail slot 613 is preferably continuous and extends along the top guide rail edge 508, around distal cutting end 502 and tip 503, and along bottom guide rail edge 509 in both the cutting portion 507 and mounting end 501 (note that only portion of slot 613 is shown for clarity). Guide rail slot 613 is configured and dimensioned to slidably receive guide tang 559 of drive link 554 therein, an example of which is as shown in FIGS. 7-9. As the saw chain 550 slides in guide rail slot 613, the guide tangs 559 steer and stabilize the chain during cutting and resists slippage of the chain off the guide bar 500, particularly due to lateral forces imparting onto the chain when making small radius curvilinear cuts in the workpiece.

Figures 11, 12, 13:
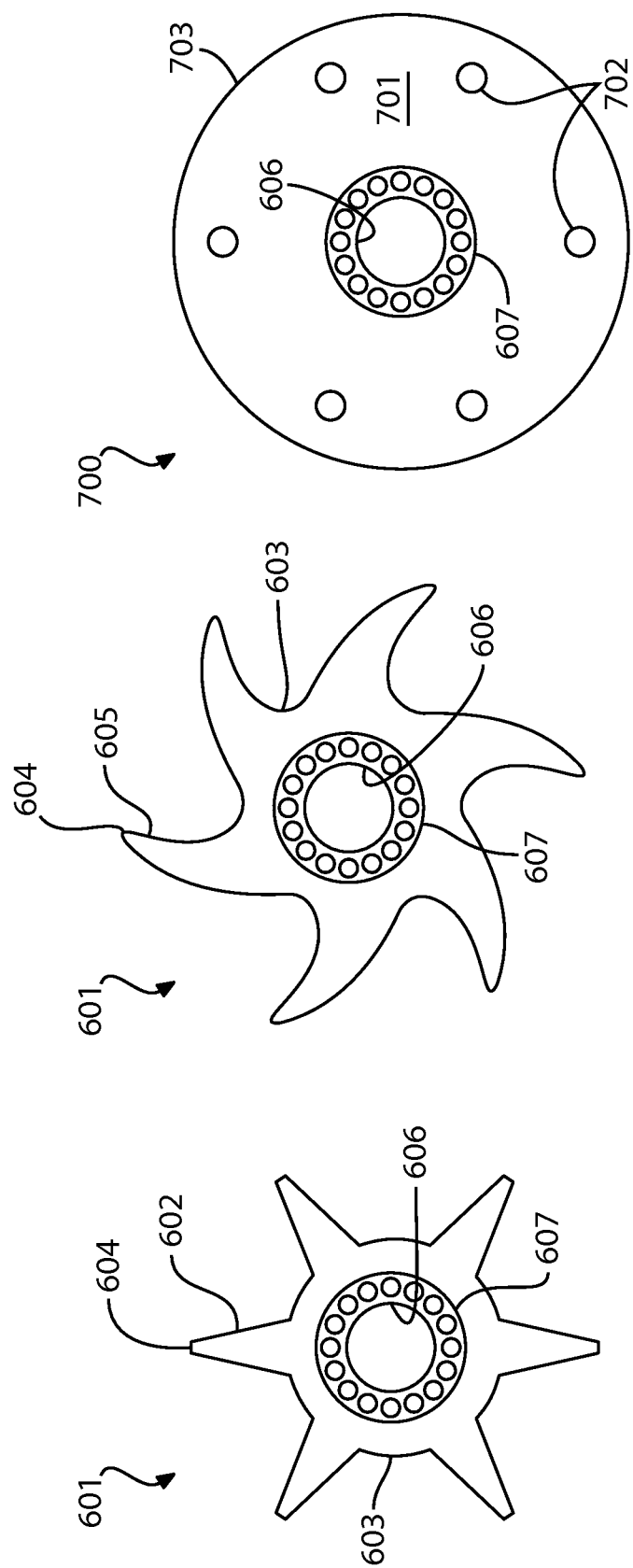
FIG. 11 is a side view of a first embodiment of an idler toothed sprocket useable with idler sprocket mechanism shown in FIGS. 5 and 6.
FIG. 12 is a side view of a second embodiment of an idler toothed sprocket useable with idler sprocket mechanism shown in FIGS. 5 and 6.
FIG. 13 is a side view of an idler sprocket wheel useable with idler sprocket mechanism shown in FIGS. 5 and 6.

Saw chain 550 is kept generally engaged with or pressed against guide bar 500 and entrained in the guide rail slot 613 by an idler sprocket mechanism 600 as shown in FIGS. 5 and 6. In some embodiments, sprocket mechanism 600 may include a rotatable sprocket 601 or alternatively a sprocket wheel 700 as shown in FIG. 13. In some embodiments, sprocket 601 may be mounted to and supported from guide bar 500 as shown in FIG. 5 or alternatively from the drive unit 504 housing (not shown). Idler sprocket 601 is freely rotating and driven by saw chain 550 as further described herein.

Given the preferred asymmetrical shape of guide bar 500 show in FIGS. 5 and 6, saw chain 550 would not conform on its own to the curved transition portion 511 formed between mounting end 501 and cutting portion 507 making the chain susceptible to slipping off the guide bar particularly when making extremely small curvilinear cuts in which a lateral force is imparted to the chain by the workpiece. It is also desirable that the saw chain 550 be fully engaged with guide bar 500 along top guide rail edge 508 at the start of the cutting portion (i.e. imaginary line V2 in FIG. 5) so the entire top guide rail edge of the cutting portion is useable to make cuts. This allows deep curvilinear bores to be made in the workpiece. Idler sprocket 601 advantageously keeps the saw chain 550 entrained in guide rail slot 613 (see, e.g. FIGS. 5 and 7) and in close sliding engagement with the guide bar 500. This beneficially further allows a wood carver to make cuts in the workpiece with either top guide rail edge 508, tip 503, or bottom guide rail edge 509 of the guide bar. Since the demands of artistic wood carving requiring all types and orientations of curvilinear cut surfaces to be made including arcs and holes (e.g. such as when carving animals or other complex shaped figures as shown in FIG. 24), this flexibility to use any part of the cutting portion 507 is beneficial for the wood carver. It enables such features to be cut with a chainsaw using any convenient available cutting surfaces of the guide bar 500 to eliminate having to hold the chainsaw in awkward positions adversely affecting the preciseness and appearance of the carved surface, or changing position of the workpiece to suit the chainsaw. Embodiments of guide bar 500 with idler sprocket 601 thus permit upwards curvilinear cuts to be made, downward curvilinear cuts, and plunge cutting with the guide bar to initiate and then deepen curvilinear cuts such as arcs and holes.

An exemplary embodiment of an idler sprocket mechanism 600 is shown in FIGS. 5, 10, and 11. FIG. 10 is a cross-sectional view through guide bar 500 and sprocket 601 taken in FIG. 5. Idler sprocket mechanism 600 includes sprocket 601 which is rotatably mounted outboard of saw chain 550 so that the chain runs between the sprocket and guide bar 500. In a preferred embodiment, sprocket 601 is mounted proximate to transition portion 511 of guide bar 500 and is positioned to prevent saw chain 550 from straightening and assuming an otherwise linear path of motion spanning between mounting end 501 and tip 503 of the guide bar when driven in motion by power drive unit 504. The back tension or pulling forces produced in chain 550 along top guide rail edge 508 when driven by the power unit 504 biases the chain towards this straightening or linear configuration. Accordingly, idler sprocket 601 is operable to counterbalance this straightening tendency of saw chain 550 and keeps the chain engaged with guide bar 500 along top guide rail edge 508 for a majority of or more preferably substantially all of cutting portion 507 starting at or near the proximal starting point thereof delineated by line V2. Also, preferably, sprocket 601 keeps saw chain 550 substantially engage with a majority or more preferably substantially all of the transition portion 511 by preventing drive links 554 (see FIG. 8) from leaving the guide rail slot 613 (see FIG. 7). Saw chain 550 therefore is forced to assume a curvilinear path of motion P between tip 503 and mounting end 501 of the guide bar 500 as shown in FIG. 5 that substantially and closely conforms to the outer peripheral top guide rail edge 508 of the guide bar such that the chain remains entrained in guide rail slot 613. This advantageously provides controlled and guided movement of saw chain 550 that allows intricate curvilinear shapes to be executed with a great degree of precision when carving the workpiece.

With continuing reference to FIGS. 5-6 and 10-11, idler sprocket 601 is most preferably positioned proximate to and spaced vertically above and slightly forward of concave surface 514 which is formed on top guide rail edge 508 of the transition portion 511 (best shown in FIG. 5). This maintains engagement between saw chain 550 and a majority of or substantially all of transition portion 511 of guide bar 500 to maintain the foregoing curvilinear path of motion P for saw chain 550 as described before. Furthermore, such positioning of idler sprocket 601 ensures that saw chain 550 is fully entrained with guide bar 500 at the beginning of cutting portion 507 of the guide bar. Without the outboard placed idler sprocket 601, saw chain 550 would not remain engaged with guide bar guide rail slot 613 particularly in the concave surface 514 or the beginning of cutting portion 507 due to the tension in the chain tending to cause it to seek a straight path between mounting end 501 and tip 503 of guide bar 500.

Referring to FIGS. 5-6 and 10-11, idler sprocket 601 defines a central axis of rotation R oriented transverse to guide bar 500. In one preferred embodiment shown in FIG. 5, the sprocket axis of rotation R is vertically aligned or close to imaginary vertical line V2 on guide bar 500 where the cutting portion 507 begins (see FIG. 5) to achieve the foregoing preferred positioning of the sprocket which keeps saw chain 550 entrained in guide rail slot 613. In this embodiment, the axis rotation R for sprocket 601 further is located to substantially coincide with the center or origin of the radius line defining concave surface 514, which preferably is configured as an arc of a circle. This placement is generally optimum for keeping chain 550 entraining in arcutately shaped guide rail slot 613 portions along the concave surface 514 of the guide bar transition portion 511 and at the onset of cutting portion 507 closest to mounting portion 501 of guide bar 500. In some embodiments, concave surface 514 of guide bar 500 defines an arc which is parallel to an imaginary circle scribed by tips 604 of sprocket drive teeth 602 as sprocket 601 rotates on its axis.

Referring to FIGS. 5, 10, and 11, one possible configuration of an idler sprocket 601 is shown in the form of a spur having a plurality of radially extending drive teeth 602 disposed on a central hub 603. Teeth 602 include tips 604 which are configured for engaging saw chain 550 (best shown in FIG. 5) and have a width at the tip preferably the same as or larger than the corresponding width of the top portion of chain 550 intended to be engaged (see FIG. 10). Arms 602 therefore have a radial length sufficient to engage chain 550.

FIGS. 6 and 12 show an alternative embodiment of an idler sprocket 601 having spiral-shaped drive teeth 605 in lieu of straight teeth 602 as shown FIG. 11. The functionality and design is otherwise the same as described above.

Figure 14:
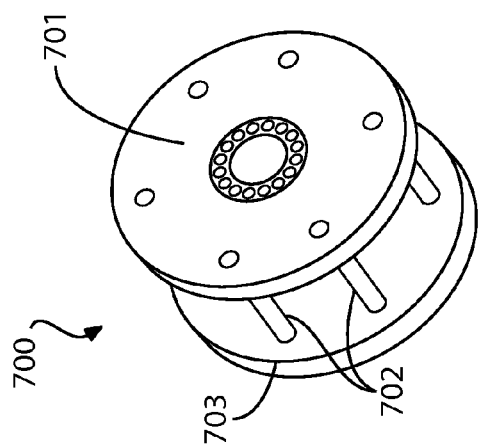
FIG. 14 is a perspective view thereof.

FIGS. 13 and 14 show an embodiment of a driven idler wheel 700 that may be used in lieu of foregoing idler sprocket 601 for keeping saw chain 550 engaged with guide bar 500. Idler wheel 700 includes two opposing spaced apart disk-shaped washers 701 and a plurality of transversely mounted drive pins 702 extending between the washers that are configured and adapted to engage saw chain 550. Drive pins 702 may have any suitable curvilinear or rectilinear cross sectional shape such as without limitation circular, square, hexagonal, and others. Pins 702 have a length preferably at least the same as and more preferably larger than the corresponding width of the top portion of chain 550 intended to be engaged to ensure full contact and engagement between the chain and pins since the wheel 700 is driven by the chain. Pins 702 may be mounted to washers 701 by any suitable conventional method used in the art such as without limitation welding, shrink fitting, or mechanical fastening.

Idler wheel 700 is preferably used in the same manner and positioned with respect to guide bar 500 the same as idler sprocket 601 described above and shown in FIGS. 5 and 6.

With continuing reference to FIGS. 13 and 14, drive pins 702 in a preferred embodiment may be radially inset from the circumferential edges 703 of washers 701 so that at least an upper portion of saw chain 550 is received therein. This arrangement advantageously ensures that the upper sides of chain 550 are straddled by the edge portions of washers 701 and pins 702 which prevent the chain from slipping laterally or transversely off of the idler wheel 700 when driven by the power unit 604.

Embodiments of idler sprocket 601 with teeth 602 or 605 and idler wheel 700 with pins 702 may be made of any suitable material, preferably metal such as without limitation suitable grades of steel or stainless steel, aluminum, titanium, or alloys and combinations thereof. Teeth 602, 605 and pins 702 may be made of the same or different materials than other parts of the sprocket or wheel.

Referring initially to FIGS. 5-6 and 11-13, drive teeth 602, 605 or drive pins 702 (depending on which are used) are circumferentially spaced around hub 603 to engage saw chain 550 preferably between cutting links 557, and most preferably immediately in front of cutter depth gauge protrusion 560 onto drive links 554 and tie links 556. In preferred embodiments, a sufficient number of drive teeth 602, 605 or drive pins 702 are provided so that the chain 550 is engaged between every pair of cutting links 557.

In operation, teeth 602, 605 or drive pins 702 commute with and are engaged by the leading (front) edge of the saw chain cutter depth gauges 560 which imparts the motive force to rotate the idler sprocket 601 or alternatively idler wheel 700 when the chainsaw motor drive unit is operated. Drive teeth 602, 605 or drive pins 702 press downwards onto tie and drive links 556, 554 forcing saw chain 550 inwards toward guide bar 500 when in operation, thereby preventing downward projecting guide tang 559 of drive links 554 from leaving guide rail slot 613 (see FIGS. 5 and 6). This resists the upward force imparted to the drive teeth 602, 605, or pins 702 by the saw chain 550 attempting to assume a straight path between drive end 501 and tip 503 due to the tension in the chain while it is circulating around guide bar

500. The idler sprocket 601 or alternatively idler wheel 700 (if used instead) is preferably positioned as already described herein so that the saw chain 550 is released from the drive teeth 602, 605 or drive pins 702 at the point of the sprocket's rotation where cutting portion 507 of the guide bar 500 begins with the saw chain being fully entrained in guide rail slot 613 at guide bar top guide rail edge 508. At this point the chain 550 will tend to remain engaged with the guide bar 500 (i.e. drive links 554 entrained in guide rail slot 613) without further guidance or restraint since the top and bottom guide rail edges 508, 509 of cutting portion 507 are substantially parallel to each other as show in FIGS. 5 and 6. This ensures that the saw chain 550 is fully stable and controlled in motion making substantially the entire cutting portion 507 useable for executing curvilinear cuts. Concomitantly, drive teeth 602, 605 or drive pins 702 first engage saw chain 550 preferably before the cutting portion of guide bar 500 begins at some point along top guide rail edge 508 of the transition portion 511.

When operating, with respect to FIGS. 5 and 6, saw chain 550 rotates in a first clockwise direction as shown by path P and idler sprocket 601 or alternatively idler wheel 700 (if used) rotates in a second opposite counter-clockwise direction (see directional arrow) being driven by chain 550. In some embodiments, as shown in FIG. 5, an end sprocket 510 may additionally be used in conjunction with an idler sprocket 601 or idler wheel 700. End sprocket 510, however, rotates in the same direction or clockwise as saw chain 550.

Based on the foregoing description, it will be appreciated that sprocket mechanism 600 is clearly distinguishable from guide bar end tip sprocket 510 in function, design, and purpose. The necessity of sprocket mechanism 600 is attributable to unique shape of guide bar 500 which is especially adapted and beneficial for carving intricate curvilinear details into wooden sculptures with a chainsaw which heretofore have been unachievable with comparable ease, expediency, and without additional tools or steps needed.

With continuing reference to FIGS. 5, 10, and 11, sprocket 601 may be mounted for rotational movement by support bracket 650 and spindle 651 passing through aperture 606 in hub 603. In some embodiments, sprocket 601 may include a bearing 607 disposed in aperture 606 which may be in the form of a ball or journal bearing or a bushing to reduce friction and increase workable life. Spindle 651 is received through bearing 607 and mounted on a distal free end 653 of support bracket 650. Support bracket 650 has an opposite proximal end 652 rigidly fastened to guide bar 500 to resist displacement by saw chain 550.

In a preferred exemplary embodiment, support bracket 650 may conveniently be mounted to guide bar 500 opposite tip 503, and preferably to transition portion 511 forward of and proximal to power drive unit 504 near mounting end 501 of the guide bar to take advantage of the tallest section of exposed guide bar material outside of the power drive unit 504. Advantageously, this mounting location for bracket 650 permits guide bar 500 to be made as short or narrow in height as practicably possible which is desirable since the radius of curvature for making sharp radius curvilinear cuts is proportional to the height of the guide bar (as further described herein). In other embodiments, however, support bracket 650 may be mounted to cutting portion 507. Alternatively, in yet other embodiments, bracket 650 may be mounted to power drive unit 504 in a similar manner to that already described herein in an exposed manner, or in alternative embodiments may be mounted internally within the power drive unit housing.

In one exemplary embodiment, proximal end 652 of support bracket 650 may be rigidly and removably mounted to guide bar 500 via fasteners such as at least one machine or carriage bolt and nut assembly 654 as shown in FIGS. 5 and 10. In some embodiments, two bolt and nut assemblies 654 are preferably provided to stabilize bracket 650 and resist tilting or movement due to drive forces imparted to the bracket by saw chain 550 when operating. The shaft of each bolt provided for bolt and nut assembly 654 is inserted through a complementary size hole in guide bar 500 and support bracket 650. In preferred embodiments, a conventional nylon or other lock nut is used in bolt and nut assembly 654 to resist vibrations caused by the operating power unit 504 (see FIG. 5). Alternatively, bracket 650 may be permanently mounted to guide bar 500 by welding, riveting, or other similar permanent mounting methods. Other suitable removable and permanent methods may be used.

Referring to FIGS. 5-6 and 10, spindle 651 preferably is a pin or shaft transversely mounted to distal end 653 of support bracket 650. In a preferred embodiment, spindle 651 may be defined by a shaft of a fastener such as a bolt of a conventional threaded machine or carriage bolt and nut assembly 654 as shown. The shaft of the bolt provided for bolt and nut assembly 654 is inserted through a complementary size hole in distal end 653 of support bracket 650. This easily disassembled arrangement permits quick replacement of idler sprocket 601 or idler wheel 700 if required. In preferred embodiments, a conventional nylon or other lock nut is used in bolt and nut assembly 654 to resist vibrations caused by the operating power unit 504 (see FIG. 5). In some embodiments, spindle 651 may be a plain pin secured to bracket 650 by locking means such as a cotter pin inserted through one end of the spindle (not shown) or other suitable device or apparatus so that spindle 651 is rotationally retained on support bracket 650. A lock nut may be used in bolt and nut assembly 654 in preferred embodiments. It will be appreciated, however, that many other suitable spindle arrangements or mounting assemblies may be used so long as sprocket 601 is supported for freely rotating movement on support bracket 650.

Idler wheel 700 may be rotatably mounted to guide bar 500 in similar manner to sprocket 601 described above using support bracket 650 and spindle 651.

Figure 15:
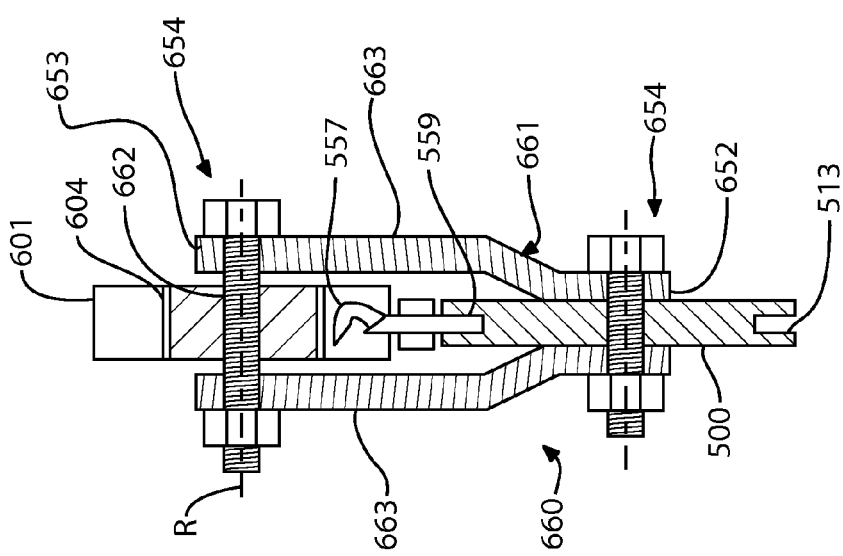
FIG. 15 is a cross-sectional view of a second mounting bracket embodiment for mounting the foregoing idler sprocket mechanisms.

FIG. 15 shows an alternative embodiment of a mounting bracket 660 in the form of a U-shaped clevis 661 and clevis pin 662 arrangement. Clevis 661 is somewhat similar to support bracket 650 but includes two spaced apart support brackets 663 as shown with idler sprocket 601 (or alternatively idler wheel 700) rotationally mounted therebetween on clevis pin 662. Clevis pin 662 may be similar to spindle 651 shown in FIG. 10 and may be defined by a shaft of a fastener such as a bolt of a conventional threaded machine bolt and nut assembly 654. Other suitable spindle assemblies may be used.

Figure 16:
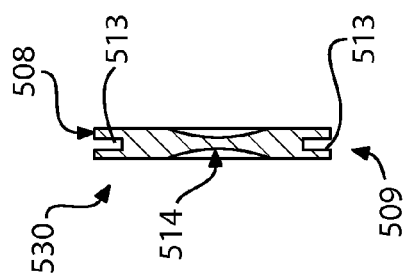
FIG. 16 is a cross-sectional view of the guide bar of FIG. 6 taken along line 16-16 therein.

FIGS. 6 and 16 shows an alternative embodiment of a chainsaw guide bar 530 having a hollow ground cutting portion 507 comprising a longitudinally-extending concave recess 514 preferably formed on both sides of the guide bar to aid in curvilinear cutting and particularly in making deep curvilinear cuts such as arcuately shaped cutouts and holes. When making curvilinear cuts into a wooden workpiece, the wood chips formed tend to pack in around and bind the guide bar particular when attempting to cut holes. Advantageously, when hollow ground guide bar 530 is plunged into a workpiece, the proximal portion of the guide bar remains outside of the workpiece along with an exposed portion of the concave recess 514. This forms a path for expelling wood chips from the workpiece as the curvilinear cut is made and aids in preventing binding of the blade thereby facilitating the formation of deep curved cuts or holes into the wooden workpiece or sculpture, in addition to facilitating small radius curvilinear cuts in a workpiece. Preferably, therefore, concave recess 514 extends for a majority of the length L1 of guide bar cutting portion 507 and further preferably extends proximate to tip 503 as shown. The concave recess 514 of the hollow ground guide bar 530 advantageously also aids in curvilinear cutting because the convex shaped wood, on the inside of the arc in the workpiece, can set into the hollow allowing an even smaller radius cuts to be achieved.

According to another variation of guide bar 530 shown in FIG. 6, the concave recess 514 may alternatively be completely cut out forming a window that extends laterally completely through the guide bar from side to side similar in concept to cut out 222 shown in FIGS. 2 and 2A. The cutout may therefore have a shape similar to hollow ground concave recess 514 in FIG. 6 or any other suitable shape. This variation also provides a path for expelling wood chips to prevent or reduce binding of the guide bar when cutting, and further lightens the weight of the guide bar which is advantageous for making precision cuts. It is well within the ambit of those skilled in the art to make such a variation of guide bar 530 based on the hollow ground guide bar 530 descriptions without further explanation.

Figures 17, 18:
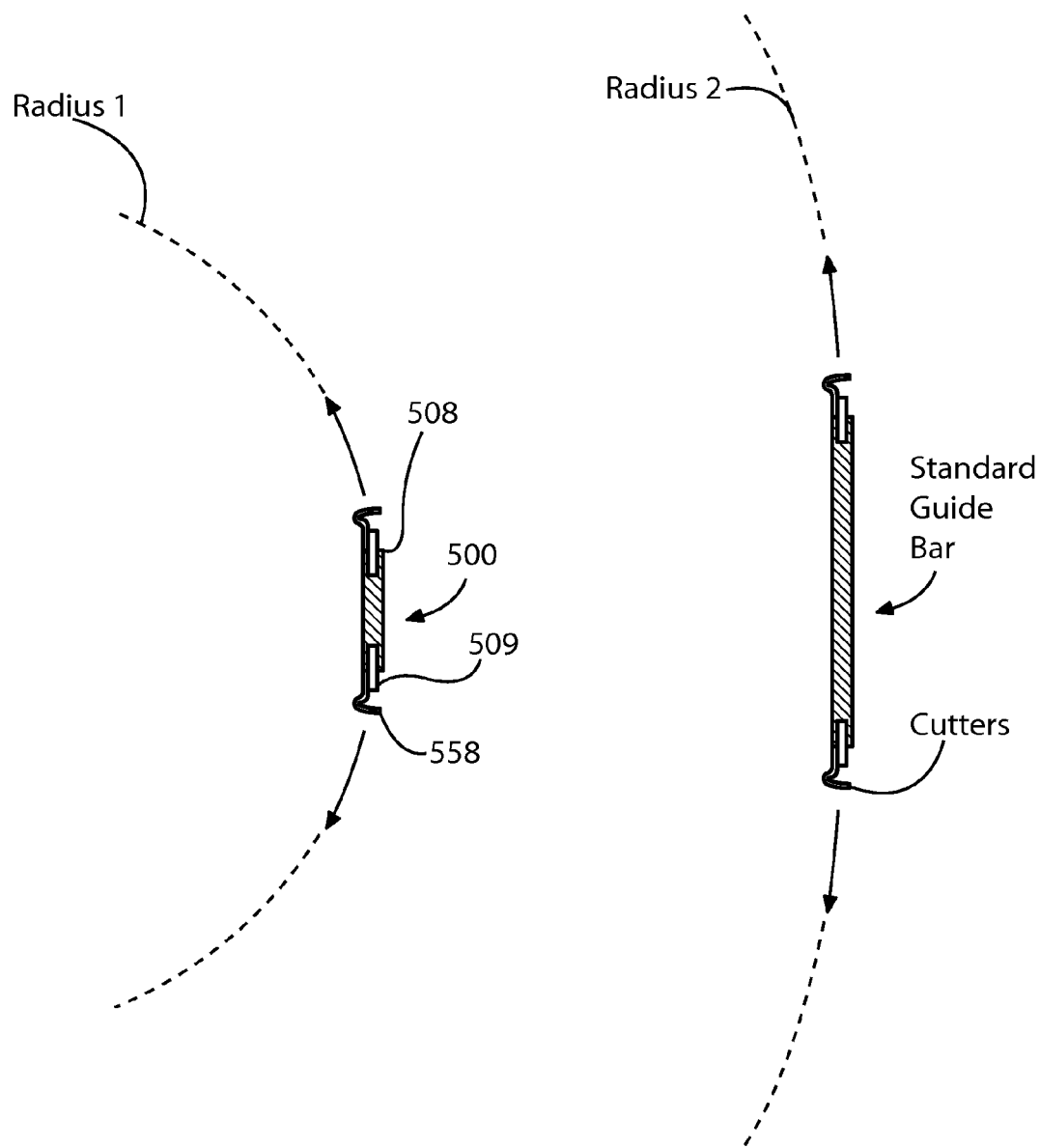
FIG. 17 is cross-sectional view of a conventional transversely broad guide bar and showing the relative size of a corresponding possible cut radius.
FIG. 18 is cross-sectional view of a transversely narrow guide bar according to embodiments of the present invention and showing the relative smaller size of a corresponding cut radius.

FIGS. 17 and 18 illustrate a comparison of cutting radiuses achievable with a conventional shape and sized guide bar and guide bar 500 according to the present invention, respectively. Theoretical cut lines are shown as dashed to illustrate the comparative improvement in curvilinear cut radius made possible with guide bar 500 based on results obtained in actual trial cuts made into wooden or other solid workpieces with each bar. As shown, the curvilinear cut Radius 1 is smaller with guide bar 500 than cut Radius R2 made with a standard/conventional chainsaw guide bar.

Advantageously, guide bar 500 allows cuts to be made in either direction (see directional arrows in FIG. 18) using both the top and bottom guide rail edges 508, 509. This versatility is made possible by the combination of the vertically narrow guide bar 500 and sprocket mechanism 600 which keeps saw chain 550 entrained with top rail edge 508. By contrast, although a conventional guide bar can cut with both top and bottom guide rail edges (see FIG. 17 directional arrows), the vertically broader guide bar prohibits the type of tight radius curvilinear cuts to be made which are extremely beneficial in aesthetic wood sculpture carving and other applications requiring tight radius cuts.

A curvilinear carving guide bar 500 with an effective cutting height H1 of ¾ inch defined by cutting portion 507 would have cutters 558 spaced about 1.25 inches apart with the left side of the guide bar horizontally inset from the left most part of cutters 558 by approximately 0.05 inches. In actual trial cuts, such a bar is capable of making a curvilinear cut arc with radius (Radius 1) of about 3 inches +/−. This compares to an arc radius (Radius 2) of about 19 inches +/− cut with a larger moderately sized conventional guide bar having a height H1 of 2¼ inches. These advantageously smaller radius curvilinear cuts are attributable to the unique configuration and smaller height H1 of guide bar 500 shown in FIGS. 5 and 6, which are made possible by the combination with and strategic placement of idler sprocket mechanism 600 described herein.

Figure 20:
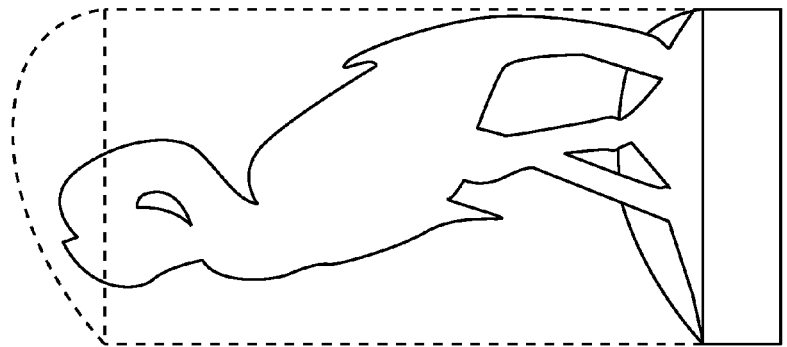
FIG. 20 shows the initial block cuts made possible by a guide bar according to embodiments of FIGS. 5 and 6.
Figure 19:
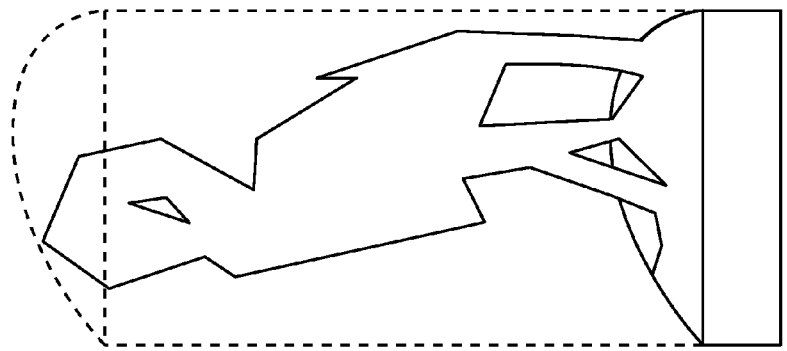
FIG. 19 shows the initial block out cuts made with the conventional guide bar of FIG. 17 in forming a decorative sculpture or object.
Figure 21:
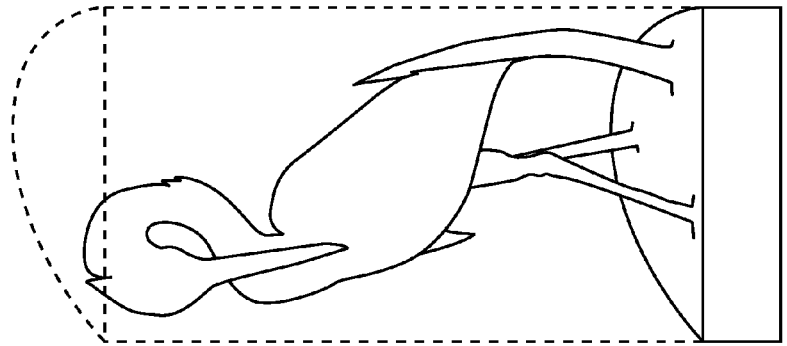
FIG. 21 shows the finished sculpture.
Figure 22:
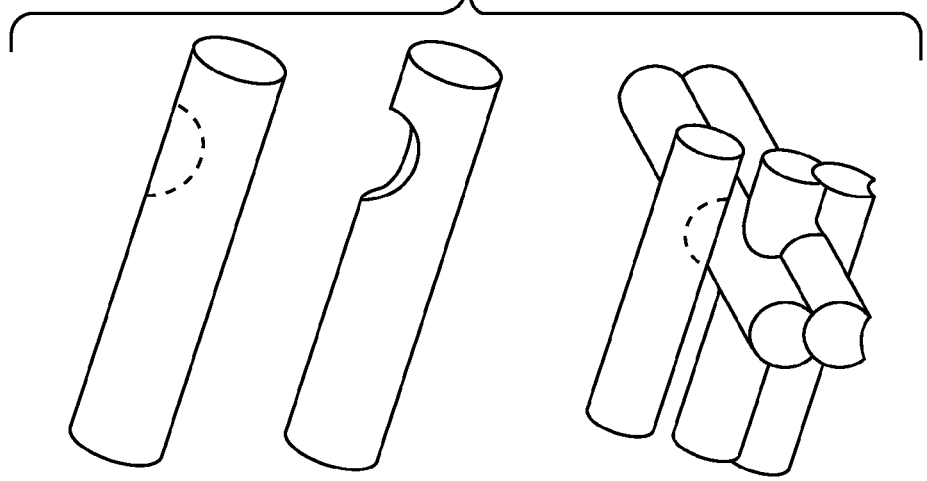
FIG. 22 shows sequential images of a method of making curvilinear arcuate notches in horizontal logs used in the construction of a log dwelling using a guide bar according to embodiments of FIGS. 5 and 6.
Figure 23:
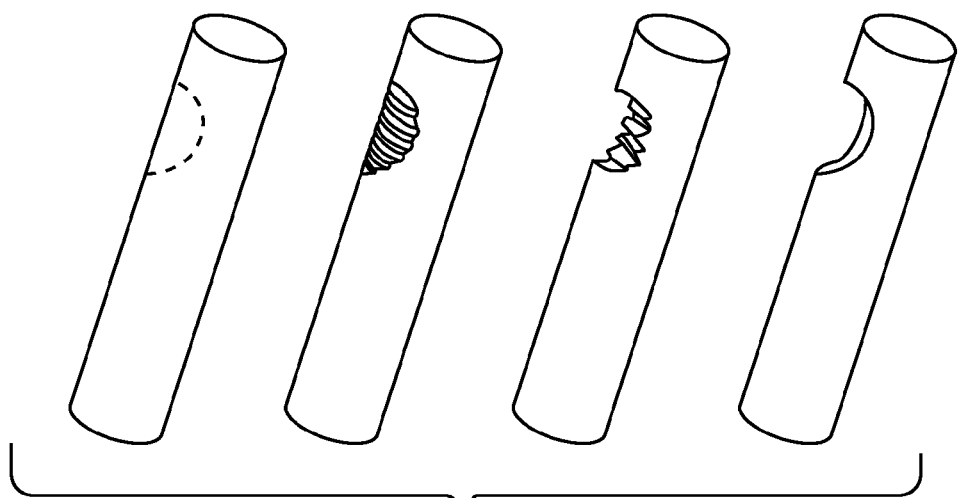
FIG. 23 shows sequential images of a method of making curvilinear arcuate notches in horizontal logs used in the construction of a log dwelling using conventional broad guide bars by contrast.

Guide bar 500 further advantageously eliminates time consuming additional finishing steps and/or the use of additional auxiliary wood shaping tools such as wood carving burr bits and/or sanders. FIGS. 19-21 illustrate this point with a non-limiting example of carving a heron using a chainsaw. Starting with a solid relatively uniform elongated workpiece WP shown in FIGS. 19 and 20, a first step in aesthetic carving of a wooden sculpture is to make initial block out cuts to approximate the shape and features of the finished sculpture to the greatest extent possible using the chainsaw alone. FIG. 19 shows the initial block out cuts made with the conventional guide bar of FIG. 17, which generally is limited to primarily rectilinear or planar slab cuts except for some large radius features (see, e.g. right side of workpiece WP). Numerous additional manual or powered wood carving tools and time consuming steps are required to achieve the finished sculpture shown in FIG. 21.

By contrast, referring to FIG. 20, the initial block cuts made possible by guide bar 500 according to the present invention advantageously allows a greater number of small radius curvilinear cuts to be initially made achieving a block out that more closely approximates the final curvilinear features of the finished sculpture of FIG. 21 than the conventional guide bar. This reduces the amount of additional carving and tooling steps required to finish the sculpture. Moreover, small radius inboard or interior curvilinear portals or features (see, e.g. opening between head and neck in FIG. 21) cannot typically be cut with conventional chainsaw guide bars in the first instance.

Contour Cutting Guide Bars

Another type of specialized cut frequently encountered in artistic sculpture or object carving with a chainsaw are arcuately shaped convex surfaces, which are generally formed on an exterior portion or surface of the workpiece and are intended to having a smoothly rounded profile when completed, such as shown for example in FIGS. 24-30 to be further described below. Prior to such contour carving guide bars as provided herein, multiple time-consuming carving steps and/or additional shaping tools were required to achieve the intended finished convex surface profile.

Referring now to FIGS. 31-34, one embodiment of a lightweight chainsaw guide bar 800 especially adapted for cutting and carving arcuately shaped convex surfaces is shown. Guide bar 800 includes a longitudinally-extending guide bar 800 having an elongated body with a rear proximal mounting end 801 configured and sized for mounting to a conventional power drive unit 504 (see, e.g. FIG. 5), a front distal working or cutting end 802 which may terminate in a generally rounded shaped working tip 803, and an intermediate portion 807 defined between the mounting and cutting ends. Mounting end 801 may be configured similarly to mounting end 501 of guide bar 500 with a plurality of oil holes 805 for lubricating saw chain 550 and mounting slots 806 for securing the guide bar to the power drive unit 504.

Figure 31:
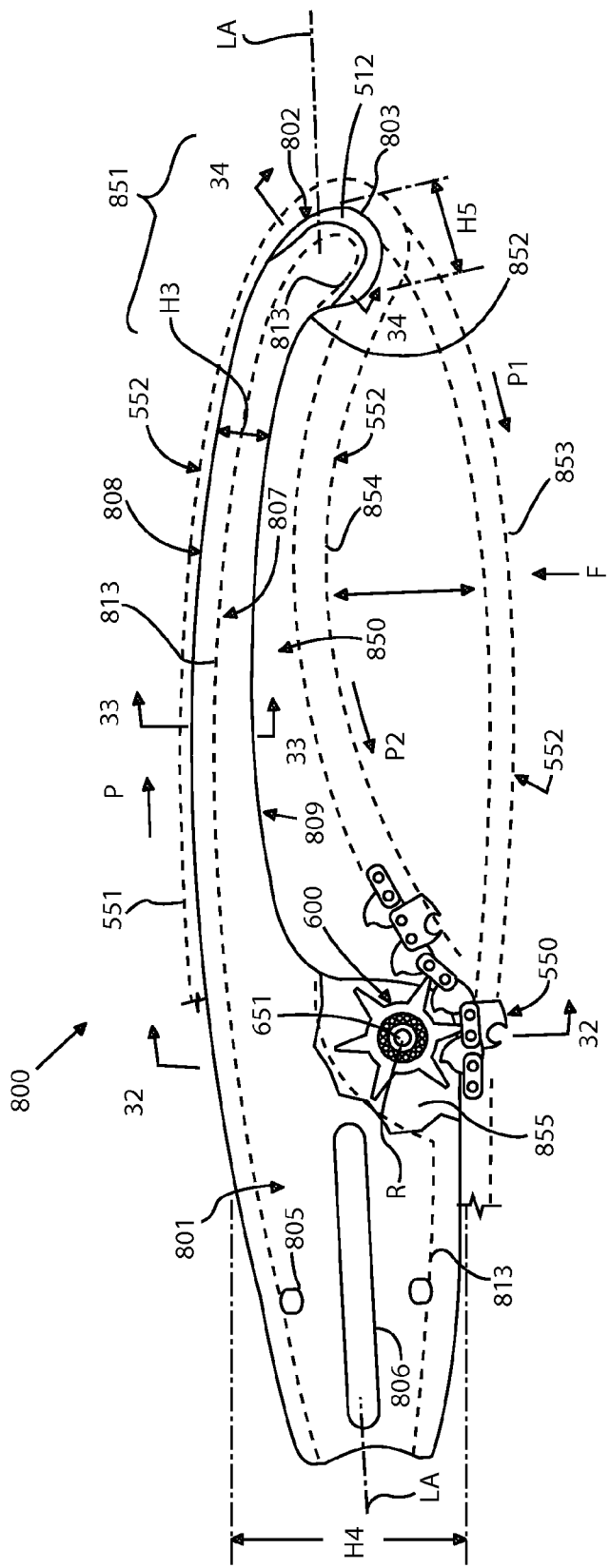
FIG. 31 is a side view of a contour cutting guide bar with idler sprocket chain guide mechanism according to another aspect of the present invention adapted for contouring and rounding a workpiece as shown in FIGS. 24-30.

Referring to FIG. 31, in this embodiment, distal working end 802 preferably has a bulbous shape which is oriented in a generally downward direction (when viewed in FIG. 31) away from longitudinal axis LA and defines a ramp for guiding the return run 552 of saw chain 550 (see chain paths P1 and P2). In this embodiment, end 802 has a height H5 therefore that is greater or larger than height H3 of narrower adjoining intermediate portion 807. Accordingly, bulbous shaped working end 802 is larger in size within the plane of the guide bar being taller and wider than adjoining intermediate portion 807 as shown.

With continuing reference to FIGS. 31-34, intermediate portion 802 of guide bar 800 is substantially narrower or shorter in height H3 than mounting end 801 having a height H4 and defines a downwardly open concave recess 850 on the bottom of the guide bar which allows saw chain 550 to be received at least partially therein in one possible position, as further described herein. This configuration and recess also reduces the weight of guide bar 800 making it more maneuverable for carving decorative sculptures or objects. Recess 850 preferably extends from mounting end 801 of guide bar 800 to distal working end 802.

Referring to FIG. 31, guide bar 800 further includes top longitudinal guide rail edge 808 including chain guide rail slot 813 (similar in configuration and purpose to guide rail slot 613 shown in FIG. 5) and a bottom longitudinal edge 809 as shown in FIG. 31. Guide rail slot 813 preferably extends along the entire top guide rail edge 808 and continues approximately 180 degrees around of the working tip 803 of the bar terminating at a point 852 preferably within recess 850 defined by the underside or bottom edge 809 of the guide bar.

In the exemplary embodiment shown in FIGS. 31-34, guide rail slot 813 preferably need not extend along the bottom edge 809 of intermediate portion 807 which may be plain (see, e.g. FIG. 33) to reduce manufacturing and associated costs. There is no guide rail slot 813 on bottom edge 809 of intermediate portion 807 because the saw chain 550 runs free and unsupported in this region, and preferably does not engage the bottom edge. In other embodiments, chain 550 may be designed to engage intermediate portion 807 in which case a guide slot 813 may preferably be provided in bottom longitudinally-extending edge 809 of the intermediate portion similarly to that shown and described in FIG. 35.

In some preferred embodiments, as shown guide bar 800 may have a generally bow shape with top longitudinal guide rail edge 808 having a slightly arcuate and convex shape.

Figure 26:
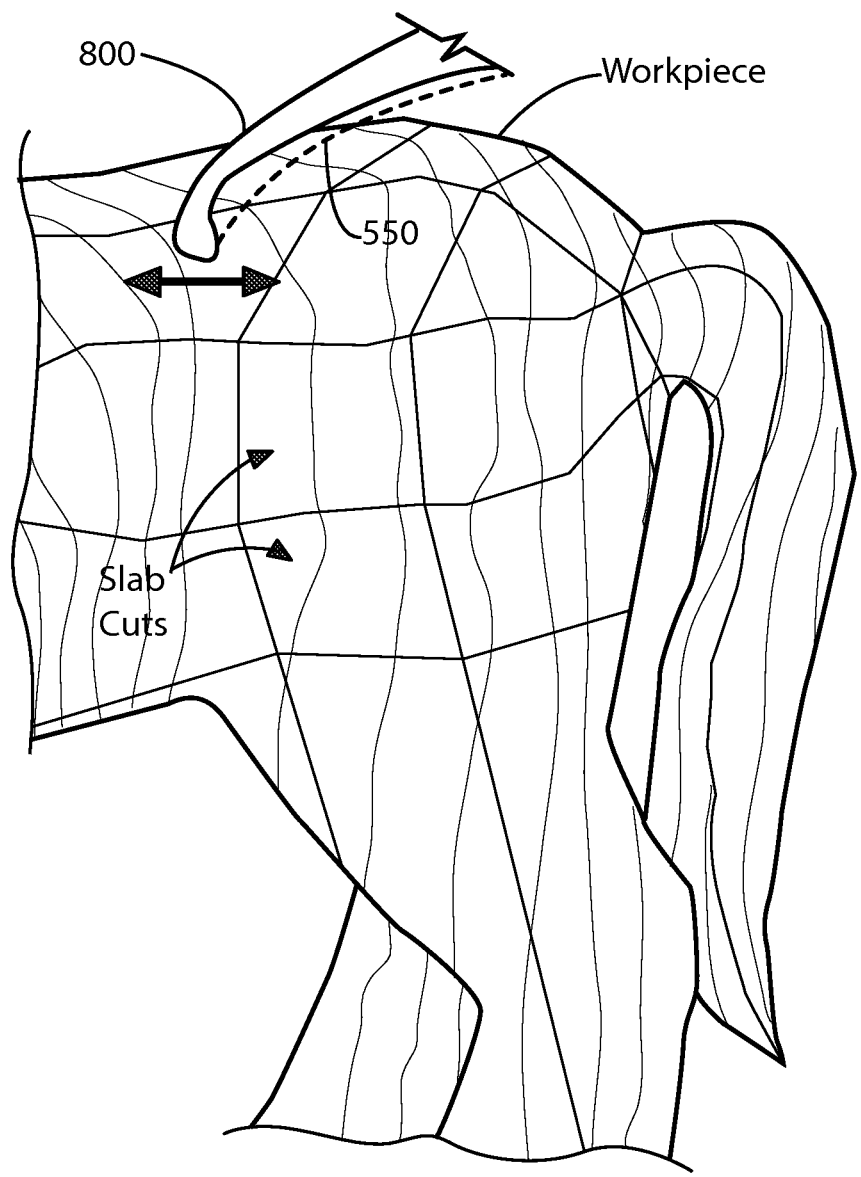
FIG. 26 shows a method of using a contouring or shaping guide bar using another embodiment of a guide bar according to the present invention shown in FIG. 31.

Guide bar 800 is designed to operate with a small amount of slack or play in the saw chain 550 adjacent concave recess 850. It is this flexible unsupported section of chain and slack that advantageously allows guide bar 800 to smoothly contour convex shapes by virtue of the unsupported and shape-conforming cutting edge of chain 550. By manipulating the guide bar 800 and chain 550 in the intermediate portion 807 of the guide bar defining recess 850, side to side movement of guide bar 800 over a workpiece as shown in FIG. 26 will cut and cause the workpiece to conform to a generally rounded and smooth shape with little effort or expertise in making such rounded shapes. Heretofore, such contouring with good results was generally achievable only by experienced carvers using conventional chainsaw guide bars, and even then such smoothly contoured or rounded convex shapes were not entirely possible without the use of additional shaping tools. Advantageously, guide bar 800 allows novice carvers to achieve smoothly rounded convex surfaces with expediency.

With continuing reference to FIG. 31, guide rail slot 813 then resumes on mounting end 801 of guide bar 800 where the proximal portion of concave recess 850 terminates and continues rearward to the endmost vertical edge of the mounting end. Preferably, guide rail slot 813 extends at least partially around and is positioned adjacent a proximally mounted sprocket 601 (similar in some embodiments to that shown in FIG. 5) that may be provided as shown and which further described below.

With continuing reference now to FIGS. 31-34, the top longitudinal guide rail edge 808 is defined by a slightly convex line culminating in a diminishing radius curve region 851 toward the distal end 802 of the guide bar 800. The working tip 803 may be fitted with an idler sprocket 510 as shown in FIG. 5 (but not shown in FIG. 31 for clarity), or alternatively tip 803 may have a hardened alloy edge 512 as shown in FIG. 31, both of which have been described herein as ways to reduce tip wear from chain 550. In other embodiments, working or cutting end 802 may just have a guide rail slot 813 as shown in FIG. 34 (cross-section) extending around tip 803 for partially receiving and guiding saw chain 550 therein around the end of the guide bar.

According to another aspect of guide bar 800, a chain return idler return sprocket mechanism 600 including a sprocket 601 is preferably further provided to re-engage and re-entrain return run 552 of saw chain 550 back into guide rail slot 813 returning from the forward unsupported span of chain below intermediate portion 807 in recess 850, as shown in FIG. 31. Sprocket 601 preferably is positioned on the bottom of guide bar 800, and more preferably on a forward and lower portion of mounting end 801 adjacent recess 850 and intermediate portion 807 of guide bar 800. Embodiments of sprocket 601 used in combination with guide bar 800 may be configured similarly to the embodiments already described herein and shown in FIGS. 5-6 and 11-12, or alternatively may have a different design in other suitable embodiments.

Referring to FIGS. 31 and 32, sprocket 601 is rotatably mounted inboard between chain 550 and guide bar 800 within a generally complementary shaped cavity 855 formed in mounting end 801 of the guide bar 800 between lateral sides 856. Spindle 651 may be mounted between lateral sides 856 of guide bar 800 to rotationally support sprocket 601 defining an axis of rotation that is preferably positioned below longitudinal axis LA and intermediate portion 807 of guide bar 800. As best shown in the cross-sectional view of FIG. 32, tips 604 of radially extending drive teeth 602 or 605 on sprocket 601 (see also FIGS. 11 and 12) preferably extend into and at least partially beyond chain guide slot 813 to engage saw chain 550. Preferably, radially drive teeth 602 or 605 are circumferentially spaced to engage the inner side/underside of tie links 556 and cutter links 557 between drive links 554 of saw chain 550 between drive links 554 (see also FIG. 8) as best shown in FIG. 31. Specifically, tips 604 of sprocket teeth 602 or 605 engage and commute with the saw chain tie and cutter links 556, 557. When in operation, tips 604 gradually engage and hold the chain 550 slightly away or spaced from the bottom guide rail edge 809 forward of mounting end 801 of guide bar 800 to smoothly ease and guide the chain back into guide rail slot 813 in bottom edge 809 of the mounting end of the bar.

Advantageously, the return sprocket 601 when used in combination with the unsupported return run 552 section of chain 550 prevents the chain from pounding and beating against guide bar 800 in the area of saw chain re-entrainment back in drive end 801 and guide rail slot 813 which would result if no sprocket were provided. This would cause severe damage to both bar and chain rendering particularly the chain useless and unusable. Such undesirable forces imparted to the chain by an otherwise unguided and unsupported chain would peen the tie straps or links 556 and cutter links 557 into the drive links 554 rendering the rivet joints immobile and rigid.

Referring to FIG. 31, unsupported return run 552 of saw chain 550 spanning between supports defined by sprocket 601 mounted in mounting end 801 and bulbous distal working end 802 of guide bar 800 provide a cutting edge that is transversely deflectable in relation to longitudinal axis LA of the guide bar for contouring or rounding convexly shaped surfaces on the workpiece. When saw chain 550 is engaged or pressed against a workpiece as shown in sequential FIGS. 27-30, an inward return force F directed towards guide bar 800 is imparted to the chain which deflects the chain vertically and transversely to longitudinal axis LA. Saw chain 550 is therefore movable and deflectable from a first undeflected position 853 disengaged with a workpiece to a second deflected position 854 engaged with a workpiece as shown in FIG. 31. The deflected position 854 is therefore closer to guide bar 800 than the undeflected position, and in some embodiments described herein may actually engage intermediate portion 807.

Saw chain 550 may assume a generally straight or slight outwardly convex shape or path P1 in the undeflected position 853, and then gradually assumes an inwardly concave and arcuate shape or path P2 in the deflected position 854 upon application of inward force F (see FIG. 31). Removal of force F causes the saw chain 550 to automatically assume the undeflected position 853 and path P1 due to the tension in the chain. Preferably, the tension in saw chain 550 is adjusted by the user to allow some slack and enable movement of the chain between the undeflected and deflected positions. The amount of deflection possible will be dependent on the tension of the chain, which may be adjusted in a conventional manner via the chain drive in the power unit 504 (see, e.g. FIG. 5). Preferably, the tension used is not so small that the chain 550 will slip out of guide slot 613 during use. It should be noted that for clarity so as not to obscure other features of guide bar 800, saw chain 550 is represented primarily by dashed lines in FIG. 31.

In some exemplary preferred embodiments, guide bar 800 may have a representative total length (measured end to end from mounting end 801 to tip 803) of approximately 12-18 inches. A representative distance between tip 803 and distal most part of mounting end 801 at sprocket 601 may be approximately 7-12 inches. Intermediate portion 807 may have a representative height H6 (see FIG. 34) of approximately ½ to 1 inches. Any suitable dimensions, however, may be used.

An exemplary method of using contour carving guide bar 800 for forming a convexly shaped surface on a workpiece will now be described with reference to FIGS. 24-30. This example shows the carving of the rear quarters of a horse, which should have a smoothly rounded outer surface profile when viewed longitudinally. The finished sculpture is shown in FIG. 24. To achieve this, the carver would first typically make a series of bulk straight vertical and horizontal slab cuts, which may be done with conventional straight cutting chainsaw guide bar resulting in a plurality of generally planar angled surfaces. The results in angled edges formed between adjoining slab cut surfaces (see FIG. 27).

Figure 27:
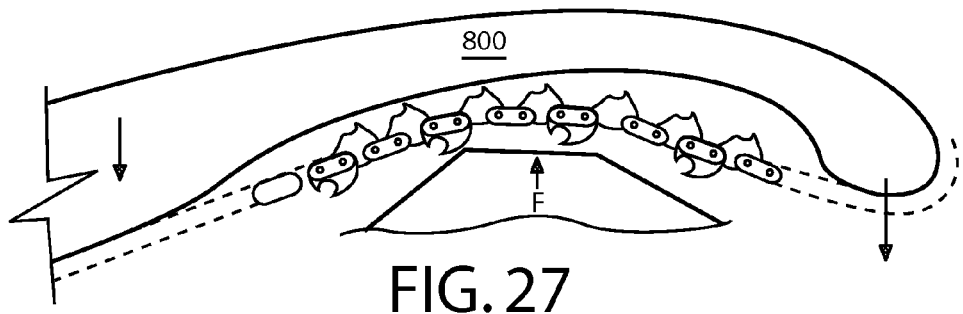
FIGS. 27-30 show sequential steps in a method of contouring or shaping a workpiece using the guide bar of FIG. 31.
Figure 28:
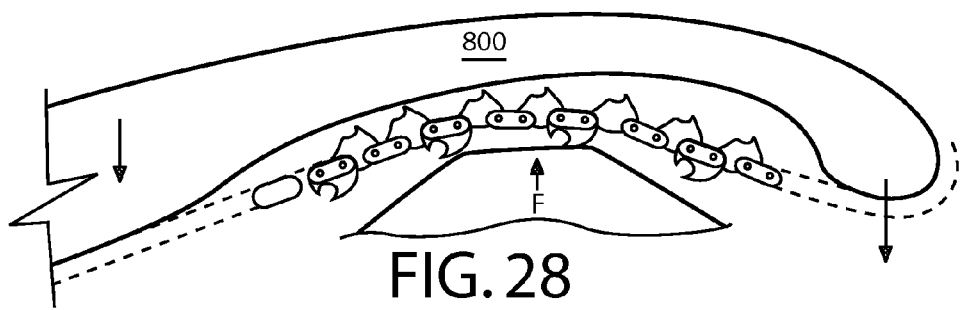
Figure 29:
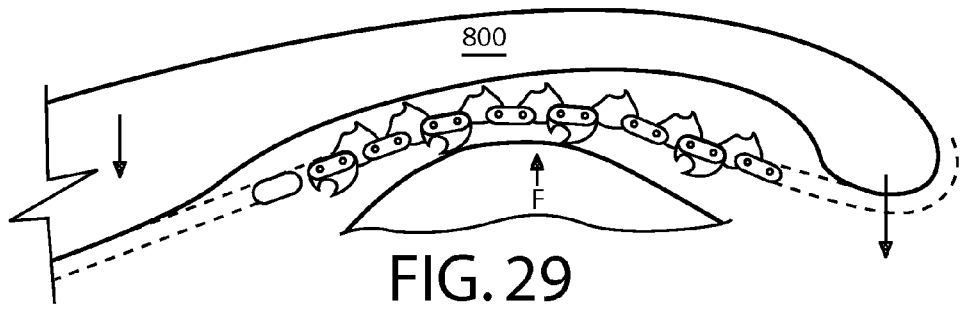

To achieve the desired rounded profile of the horse sculpture, the user next positions guide bar 800 over selected angled corners on a portion of the workpiece to be rounded. Next, the user engages and presses the unsupported deflectable return run 552 of saw chain 550 against the workpiece as shown in FIG. 27 (see downward directional arrows on guide bar 800). A return and upward normal force is imparted back onto saw chain 550 which moves the chain from the undeflected position 853 to deflected position 854 as shown in FIG. 31. Chain 550 may assume a continuum of positions between a maximum deflected position 854 and undeflected position 853 (when not engaged with the workpiece) depending on the amount of pressure applied to the workpiece with guide bar 800.

Figure 30:
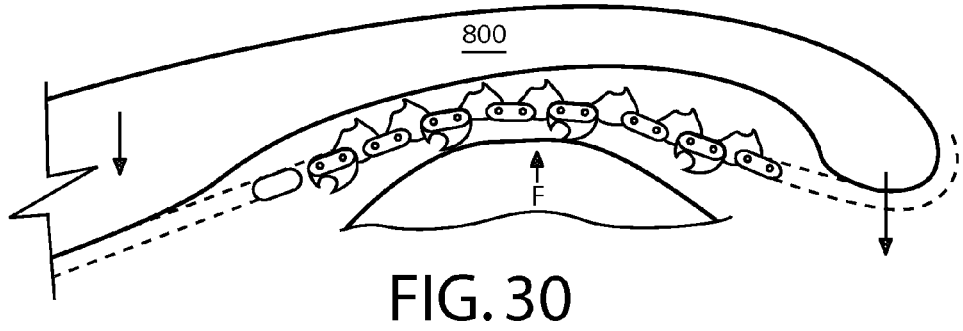

The saw chain 550 engages at least one or more angled corners selected as shown in FIG. 27. The user then moves guide bar 800 back and forth longitudinally in this example as shown in FIG. 26 while simultaneously maintaining and continuing to press saw chain 550 against the workpiece with suitable downward pressure. As shown sequentially in remaining FIGS. 28-30, the saw chain 550 generally conforms in shape to the profile of the workpiece as pressure is maintained. This gradually results in smoothing and rounding of the angled corners until a relatively smoothly radius convex profile is obtained as shown in FIG. 30. The user may then select and contour the remaining angled corners in the same foregoing manner described to ultimately achieve the finished contour depicted in the sculpture of FIG. 24.

Advantageously, it will be appreciated that guide bar 800 with the self-conforming unsupported span of saw chain 550 allows a smoothly rounded convex surface to be easily and quickly achieved without additional tools or without a great deal of expertise and/or experience in artistic carving.

Although contouring or rounding of longitudinally-extending and generally horizontal angled corners is shown in the example depicted in FIGS. 25-30, it will be appreciated that such corners of any orientation including vertical and between vertical and horizontal may be contoured by holding a chainsaw equipped with contour carving guide bar 800 in various positions as needed.

Figure 35:
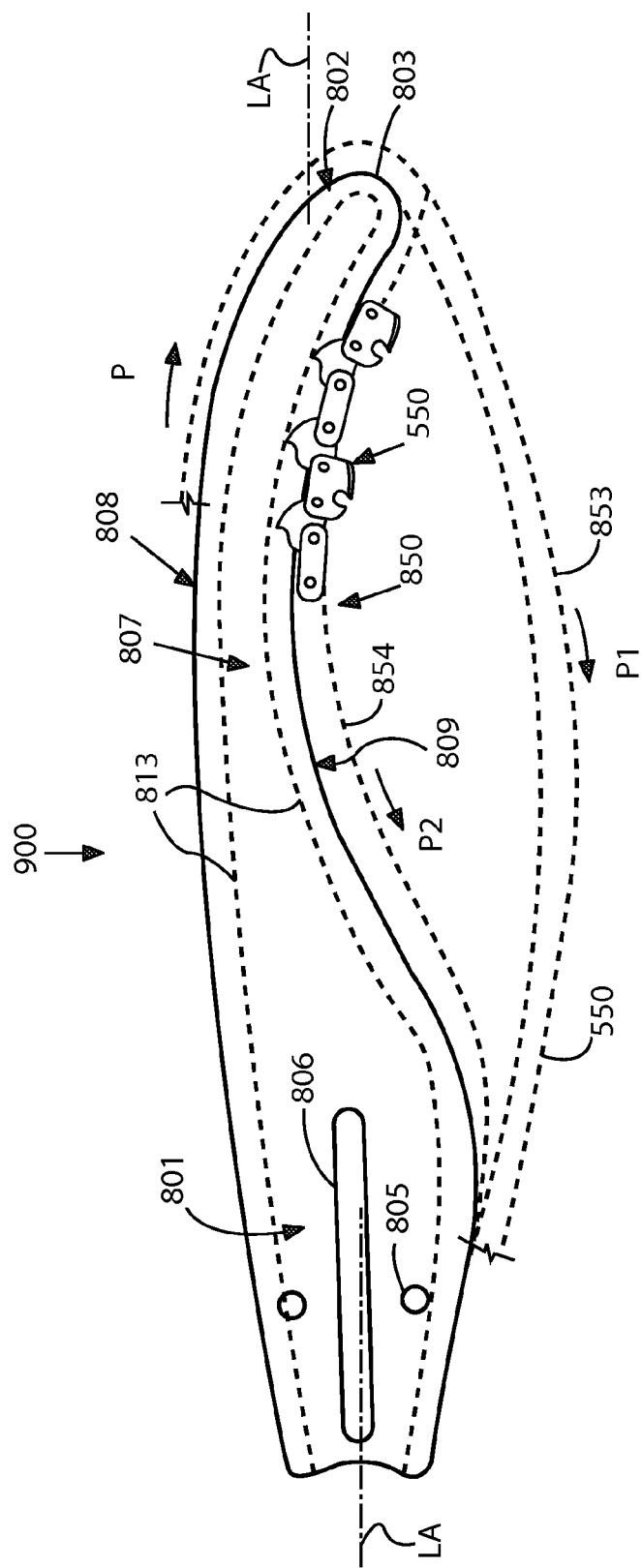
FIG. 35 is a side view of an alternative embodiment of a contour cutting guide bar without an idler sprocket chain guide mechanism according to another aspect of the present invention adapted for contouring and rounding a workpiece as shown in FIGS. 24-30.

FIG. 35 shows an alternative embodiment of a contour cutting/carving guide bar 900, which is a variation of guide bar 800 already described fully herein. In this embodiment, sprocket mechanism 600 has been eliminated and distal working end 802 is downwardly curved and rounded, but not bulbous as in FIG. 31. Top guide rails edge 808 is slightly convex in shape and bottom guide rail edge 809 has a complementary concave shape as shown so that some curved portions of the guide bar edges are generally parallel. In addition, mounting end 801 has a shape that more gradually transitions into intermediate portion 807 than in FIG. 31 since sprocket mechanism 600 is omitted. In this embodiment, chain guide slot 813 is provided on both the top and bottom longitudinally-extending guide rail edges 808, 809 since the chain 550 is preferably intended to be fully deflected during use until the chain becomes entrained in guide slot 813 along bottom edge 809 as shown. Guide bar 900 is the same with respect to functionality and method of use for forming convexly contoured surfaces in a workpiece as guide bar 800 already described.

It will be appreciated that the user may also use the top of guide bars 800 or 900 to cut or carve surfaces with a complementary shape as the guide rail edges 808. Accordingly, saw chain both on the top and below these guide bars may be used for cutting and carving.

Figure 36:
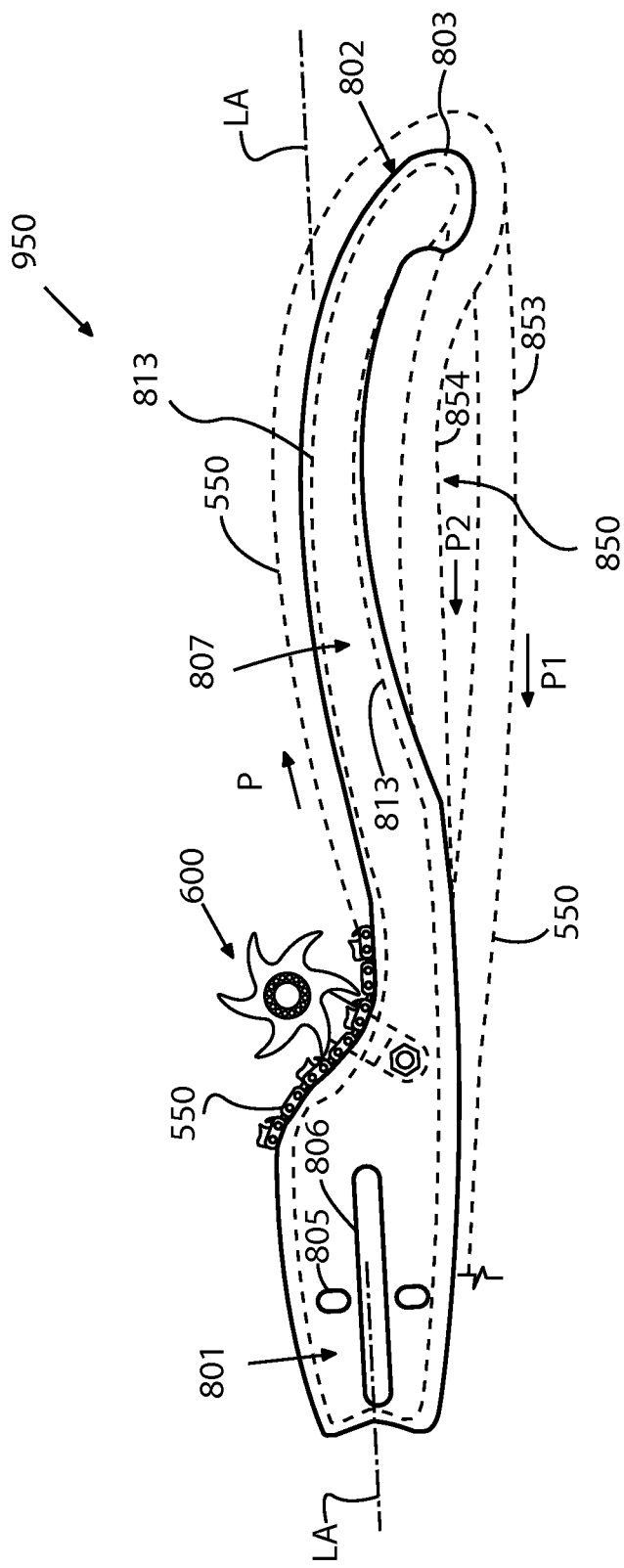
FIG. 36 is a side view of an alternative embodiment of a contour cutting guide bar with an idler sprocket chain guide mechanism according to another aspect of the present invention adapted for contouring and rounding a workpiece as shown in FIGS. 24-30.

FIG. 36 shows yet another alternative embodiment of a contour cutting/carving guide bar 950, which is a variation of guide bar 800 already described fully herein. In this embodiment, a top sprocket mechanism 600 similar in arrangement and design to that shown in FIG. 5 is provided to effectively maintain the saw chain 550 in engagement with the top portion of the guide rail slot 813, as its path is such to reduce the height of the intermediate portion 807 and working end 802 of the guide bar 950. Guide bar 950 includes a bulbous distal working end 802 similar to that shown in the embodiment of FIG. 31, which is downwardly curved and rounded. Top guide rail edge 808 forward of the top sprocket mechanism 600 is vertically offset downwards from top edge of mounting portion 801 of the guide bar 950, and further has a compound shape with concave and adjoining convex shaped top edges as shown in FIG. 36. This offset generally eliminates the need for a bottom sprocket mechanism 600 as shown in FIG. 31 since the bottom edge 809 of mounting portion 801 is closely axially aligned, although not perfectly, with corresponding bottom edge 809 of intermediate portion 807. Bottom guide rail edge 809 of both the mounting end 801 and intermediate portion 807 of guide bar 950 are smoothly transitioned and contain a guide rail slot 813. Therefore, chain 550 becomes entrained in bottom guide rail slot 813 in the intermediate portion 807 when in deflected portion 854 to maintain controlled entry of the return run 552 of the chain back into mounting portion 801 to prevent damage and reduce wear to guide bar at that location. The shape of bottom edge 809 of guide rail 950 is similar to that shown in FIG. 31.

With continuing reference to FIG. 36, the bottom edge 808 follows the curve of the top guide rail edge 809 maintaining a relatively constant height until bulbous distal end 802. Additionally, bottom guide rail edge 809 in intermediate portion 807 may include a full or partial guide slot 813 to hold the chain 550 in place when contacting a workpiece. This embodiment allows the user the ability to produce smoothly rounded shapes by virtue of the free span of chain on the bottom of the guide bar. In addition, the convex shape of the top guide rail edge 808 allows the user to cut and conform a work piece to that same shape producing a concave surface with little experience or expertise as compared to manipulating a guide bar tip to produce the same concave surface. The method of using guide bar 950 is similar to that of guide bar 800 as already described herein.

The guide bars disclosed herein may further be made of any suitable material conventionally used to fabricate chainsaw guide bars. Accordingly, these guide bars are preferably made of metal such as without limitation steel, titanium, aluminum, or alloys thereof. The guide bars can further be of solid, composite, or laminate materials and constructions. Accordingly, the guide bars disclosed herein may be formed from a single metal plate or constructed from a composite of two or more plates that are laminated and abutted together and/or spaced apart and coupled together via any suitable means conventionally used in the art. Embodiments of the present guide bar invention are therefore not limited by choice of materials or manner of construction.

Embodiments of the guide bars disclosed herein may be used in many application not limited to artistic carving of decorative sculptures or objects, but in any application requiring small radius curvilinear cuts (convex or concave) or contouring and smoothing of convex shaped work surfaces. The guide bars disclosed herein may further be used with equal benefit to carve or cut wooden workpieces, but with other materials amendable to cutting with a chainsaw including without limitation workpieces formed of ice (e.g. ice sculptures), polymers or composite materials, and others.

Embodiments of the guide bars disclosed herein may be used in any orientation for cutting and carving including completely inverted from the positions shown herein in the figures, vertically, or at any angle therebetween. Accordingly, the preferred orientations shown in the figures are by no means limiting with respect to the possible positions in which the guide bars may be used, being only restricted by possible limitations imposed by the internal combustion engines used in some embodiments of the chainsaw power drive units 504.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

What is claimed is:

1. A chainsaw guide bar adapted for rounding and contouring workpiece surfaces comprising:
   an elongated guide bar body including a peripheral guide rail slot configured to slidably engage a circulating saw chain and extending at least partially around the guide bar;
   a broadened proximal mounting end defining a longitudinal axis and configured for mounting to a power drive unit;
   a narrow distal working end;
   an intermediate portion extending between the mounting and working ends;
   the guide bar body defining a concave shaped and downwardly open elongated recess extending axially between the mounting and working ends that provides an unsupported flexible span of saw chain between the mounting and working ends, the saw chain being movable into and out of the recess between an undeflected position defining a first path and a deflected position defining a second path; and
   an idler sprocket mechanism rotatably disposed in the mounting end of the guide bar body adjacent to the elongated recess, the sprocket mechanism configured and arranged to engage a return run of the saw chain and being operative to guide the saw chain into a portion of the guide rail slot disposed on a bottom edge of the mounting end;
   wherein the unsupported span of saw chain is operable to conform to a shaped surface of a workpiece and round the surface.

2. The guide bar of clam 1, wherein the guide rail slot extends along a longitudinally extending top edge of the guide bar between the mounting and working ends, the guide rail slot along the top edge slidably engaging an outward run of the saw chain.

3. The guide bar of claim 1, wherein the guide bar body includes a longitudinally extending outwardly convex shaped top edge disposed between the mounting end and working end for carving a shape in the workpiece conforming to the shape of the top edge.

4. The guide bar of claim 1, wherein the saw chain is movable to the deflected position by engaging the unsupported span of saw chain with the workpiece surface.

5. The guide bar of claim 1, wherein a majority of the intermediate portion of the guide bar between the mounting and working ends does not include the guide rail slot along a longitudinally extending bottom edge of the intermediate portion.

6. The guide bar of claim 1, wherein the second path has an arcuate shape.

7. The guide bar of claim 1, wherein the distal working end is oriented in a downward direction away from a longitudinal axis of the guide bar.

8. The guide bar of claim 7, wherein the distal working end has a bulbous shape.

9. The guide bar of claim 1, wherein the idler sprocket mechanism is a toothed sprocket wheel.

10. The guide bar of claim 9, wherein the sprocket wheel is mounted on a bottom portion of the proximal mounting end and arranged to engage the return run of the saw chain.

11. The guide bar of claim 9, wherein the sprocket wheel is mounted in a cavity formed in the mounting end of the guide bar.

12. The guide bar of claim 1, wherein the guide bar body has an asymmetrical shape.

13. The guide bar of claim 1, wherein the intermediate portion includes a longitudinally extending bottom edge adjacent the recess that includes the guide rail slot, the guide rail slot on the bottom edge of the intermediate portion being engageable with a return run of the saw chain when in the deflected position.

14. A chainsaw guide bar adapted for rounding and contouring workpiece surfaces comprising:

an elongated guide bar body;

a broadened proximal mounting end defining a longitudinal axis and configured for mounting to a power drive unit;

a narrow distal working end having a height less than a height of the mounting end;

an intermediate portion extending between the proximal mounting and distal working ends;

a longitudinal top guide rail edge extending between the mounting and working ends;

a longitudinal bottom guide rail edge extending between the mounting and working ends;

a peripheral saw chain guide rail slot disposed in the longitudinal top guide rail edge and extending at least partially around the distal working end, the guide rail slot being configured to slidably engage a circulating saw chain supported by the guide bar body;

the guide bar body defining a concave shaped and downwardly open elongated recess extending axially between the mounting and working ends that provides an unsupported flexible span of saw chain between the mounting and working ends, the saw chain being movable into and out of the recess between an undeflected position defining a first path and a deflected position defining a second path;

a toothed idler sprocket wheel rotatably mounted to a bottom portion of the mounting end of the guide bar body adjacent to the elongated recess, the sprocket wheel configured and arranged to engage a return run of the saw chain and being operative to guide the saw chain into a portion of the guide rail slot disposed on a bottom edge of the mounting end;

wherein the unsupported span of saw chain is operable to conform to a shaped surface of a workpiece and round the surface.

15. The guide bar of claim 14, wherein the longitudinal top guide rail edge has an outwardly curving arcuate shape between the mounting and working ends for carving a shape in the workpiece conforming to the shape of the longitudinal top guide rail edge.

16. The guide bar of claim 14, wherein the guide bar has an asymmetrical shape in which the intermediate portion is offset from the longitudinal axis defined by the mounting end.

* * * * *